US012134935B2

(12) United States Patent
Krantz-Lilienthal et al.

(10) Patent No.: US 12,134,935 B2
(45) Date of Patent: Nov. 5, 2024

(54) CENTER DROP SHADE MOUNT

(71) Applicant: Springs Window Fashions, LLC, Middleton, WI (US)

(72) Inventors: Eric Nathan Krantz-Lilienthal, Janesville, WI (US); Jessica Maddocks, McFarland, WI (US)

(73) Assignee: Springs Window Fashions, LLC, Middleton, WI (US)

( * ) Notice: Subject to any disclaimer, the term of this patent is extended or adjusted under 35 U.S.C. 154(b) by 360 days.

(21) Appl. No.: 15/965,512

(22) Filed: Apr. 27, 2018

(65) Prior Publication Data

US 2018/0313147 A1 Nov. 1, 2018

Related U.S. Application Data

(60) Provisional application No. 62/491,714, filed on Apr. 28, 2017.

(51) Int. Cl.

| | |
|---|---|
| ***E06B 9/42*** | (2006.01) |
| ***E06B 9/50*** | (2006.01) |
| ***E06B 9/78*** | (2006.01) |
| *E06B 9/40* | (2006.01) |

(52) U.S. Cl.

CPC .................. *E06B 9/42* (2013.01); *E06B 9/50* (2013.01); *E06B 9/78* (2013.01); *E06B 2009/402* (2013.01); *E06B 2009/405* (2013.01); *E06B 2009/425* (2013.01); *E06B 2009/785* (2013.01)

(58) Field of Classification Search

CPC ........ E06B 9/42; E06B 9/50; E06B 2009/402; E06B 2009/405; E06B 9/78; E06B 2009/785; E06B 9/08; E06B 9/34; E06B 9/54; E06B 9/58; E06B 9/40; E06B 9/44; E06B 9/48

USPC ................................ 248/266–272; 160/323.1

See application file for complete search history.

(56) References Cited

U.S. PATENT DOCUMENTS

| | | | | | |
|---|---|---|---|---|---|
| 152,256 | A * | 6/1874 | Stowe | E06B 9/50 248/266 |
| 1,706,261 | A * | 3/1929 | Strongson | E06B 9/58 160/293.1 |
| 3,102,584 | A * | 9/1963 | Znamirowski | E06B 9/78 160/300 |
| 3,424,224 | A * | 1/1969 | Lowe | E06B 9/40 160/308 |
| 3,822,733 | A * | 7/1974 | Lindelow | G03B 15/06 160/120 |
| 3,900,063 | A * | 8/1975 | Roller | E06B 9/17 160/310 |

(Continued)

FOREIGN PATENT DOCUMENTS

| | | | | |
|---|---|---|---|---|
| CA | 2801506 A1 * | 9/2013 | E06B 9/42 |
| GB | 2392703 A * | 3/2004 | E06B 9/42 |

*Primary Examiner* — Daniel P Cahn

*Assistant Examiner* — Jeremy C Ramsey

(74) *Attorney, Agent, or Firm* — Michael Best & Friedrich LLP

(57) ABSTRACT

A covering for an architectural opening includes a bracket, a shaft coupled to the bracket, and a roller assembly coupled to the bracket, the roller assembly including, a material roll with a covering material, and a drive roller drivingly coupled to the material roll and operable to rotate with respect to the bracket about a first rotational axis, wherein the covering material includes a first portion that extends between the material roll and the shaft.

18 Claims, 24 Drawing Sheets

(56) References Cited

U.S. PATENT DOCUMENTS

| | | | | |
|---|---|---|---|---|
| 4,020,889 | A * | 5/1977 | Karoll | E06B 9/24<br>160/120 |
| 4,453,584 | A * | 6/1984 | Steele | E06B 9/24<br>160/121.1 |
| 10,208,535 | B2 * | 2/2019 | Marocco | E06B 9/322 |
| 2017/0362892 | A1 * | 12/2017 | Marzilli | E06B 9/56 |
| 2019/0249488 | A1 * | 8/2019 | Campagna | E06B 9/58 |

* cited by examiner

CENTER DROP SHADE MOUNT

CROSS-REFERENCE TO RELATED APPLICATIONS

This application claims priority to U.S. Provisional Patent Application No. 62/491,714, filed Apr. 28, 2017 and entitled Center Drop Shade Mount, the contents of which is hereby incorporated by reference in its entirety.

FIELD OF THE DISCLOSURE

The present invention relates to coverings for architectural openings. More specifically, the present invention relates to a mounting assembly for a window shade.

SUMMARY

In one aspect, the disclosure provides a covering for an architectural opening includes a bracket, a shaft coupled to the bracket, and a roller assembly coupled to the bracket, the roller assembly including, a material roll with a covering material, and a drive roller drivingly coupled to the material roll and operable to rotate with respect to the bracket about a first rotational axis, wherein the covering material includes a first portion that extends between the material roll and the shaft.

In another aspect, the disclosure provides a method assembling a covering for an architectural opening that includes coupling a bracket and a chain diverter to the architectural opening, mounting a roller assembly to the bracket, wherein the roller assembly includes a chain, and inserting the chain into the chain diverter.

In another aspect, the disclosure provides a covering for an architectural opening including a bracket, a shaft coupled to the bracket, and a roller assembly coupled to the bracket. The roller assembly includes a material roll with a covering material and a drive roller drivingly coupled to the material roll. The drive roller is operable to rotate with respect to the bracket about a first rotational axis. The covering material includes a first portion that extends between the material roll and the shaft.

The covering material may include a second portion that extends from the shaft and extends within a plane.

The covering material may be configurable to include a second portion of a first length that extends within the plane and a second portion of a second length, longer than the first length that extends within the plane.

The covering may include a chain diverter coupled to the bracket, and the chain diverter may define a centerline that extends within the plane.

The chain diverter may be adjustably coupled to the bracket in at least two positions.

The chain diverter may include a guide portion to receive a chain.

The chain diverter may include two flanges that define a non-linear opening.

The shaft may be rotatable with respect to the bracket about a second rotational axis.

The second rotational axis may be offset from the first rotational axis in at least two directions.

The covering material may include a second portion that extends from the shaft in a plane, regardless of a length the second portion extends from the shaft.

In another aspect, the invention provides a method of assembling a covering for an architectural opening. The method includes coupling a bracket and a chain diverter to the architectural opening and mounting a roller assembly to the bracket. The roller assembly includes a chain, and the method further includes inserting the chain into the chain diverter.

The method may include inserting the chain into the chain diverter while the chain forms a complete loop.

The method may include inserting a leading portion of the chain and inserting a trailing portion of the chain.

The method may include coupling a chain hold down to the architectural opening.

The method may include mounting a shaft assembly to the bracket.

The roller assembly may include a covering material coupled to a roller, and the method may include routing the covering material to the shaft assembly.

Other aspects of the invention will become apparent by consideration of the detailed description and accompanying drawings.

Figure 1:
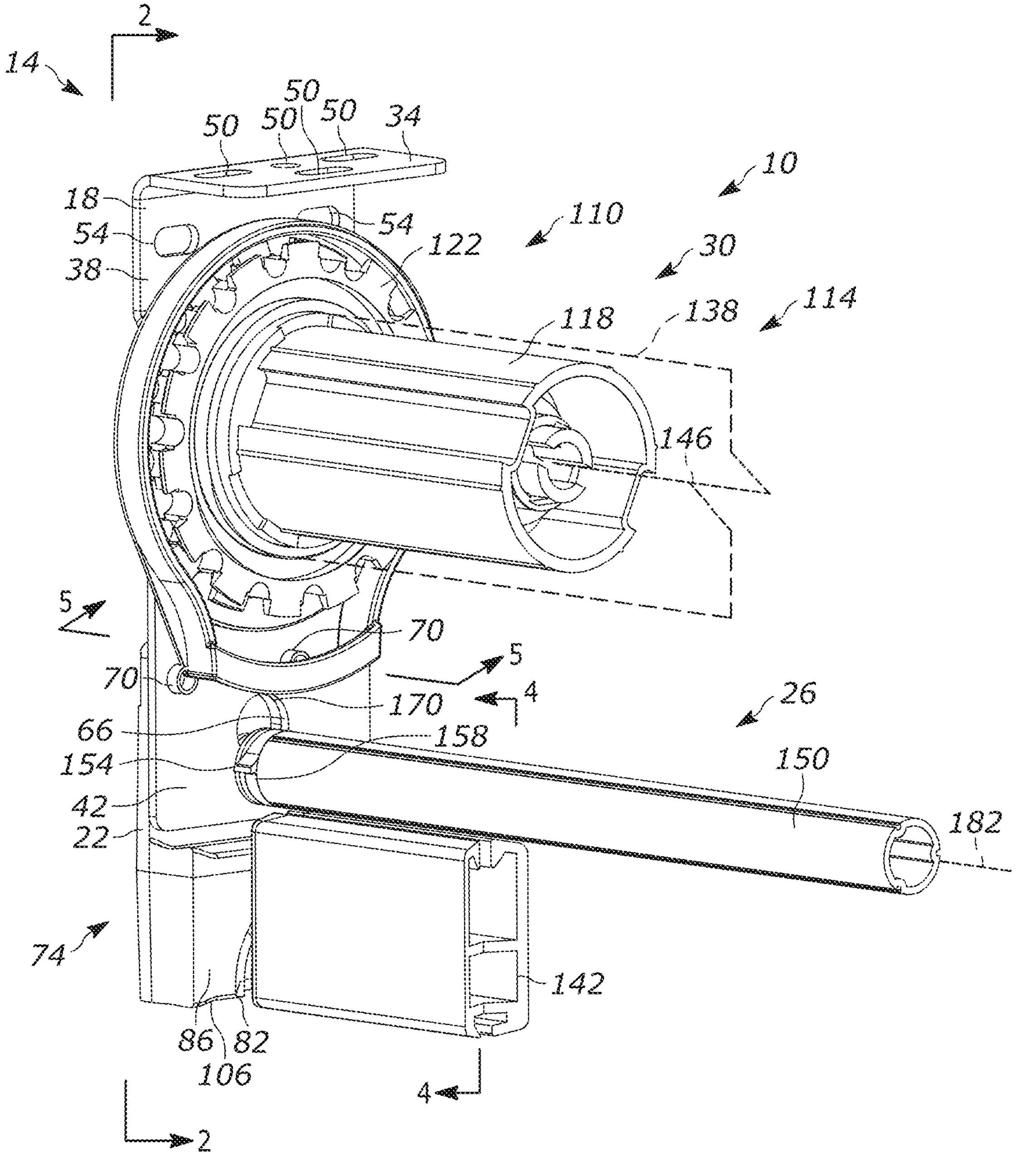
FIG. 1 is a perspective view of a covering including a shade mount assembly according to one aspect of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

With reference to FIGS. 1-7, a covering 10 (e.g., a window shade, etc.) including a mounting assembly 14 for covering an architectural opening (e.g., a window, a C-channel, etc.) is illustrated. The mounting assembly 14 includes a pair of brackets 18, a chain diverter 22, and a diverter shaft assembly 26. Each bracket 18 is respectively coupled to an opposing end of the diverter shaft assembly 26 to support the diverter shaft assembly 26. However, for sake of brevity, only one side of the mounting assembly 14 is illustrated and discussed in detail. The opposing side is a mirror image of the mounting assembly 14, with like numbers identifying like components. The mounting assembly 14 includes at least one diverter 22 (or chain diverter 22 or continuous loop operator diverter 22) coupled to one of the brackets 18. In other embodiments, each bracket 18 can includes a respective chain diverter 22. The covering 10 also includes a roller assembly 30, parts of which are not shown or otherwise schematically shown for clarity purposes. The covering 10 is supported by the mounting assembly 14 within the architectural opening. As explained in greater detail below, the mounting assembly 14 advantageously positions the roller assembly 30 in a consistent, aesthetically pleasing manner and utilizes the same components for both sides of the assembly to minimize the number of unique parts.

Figure 10:
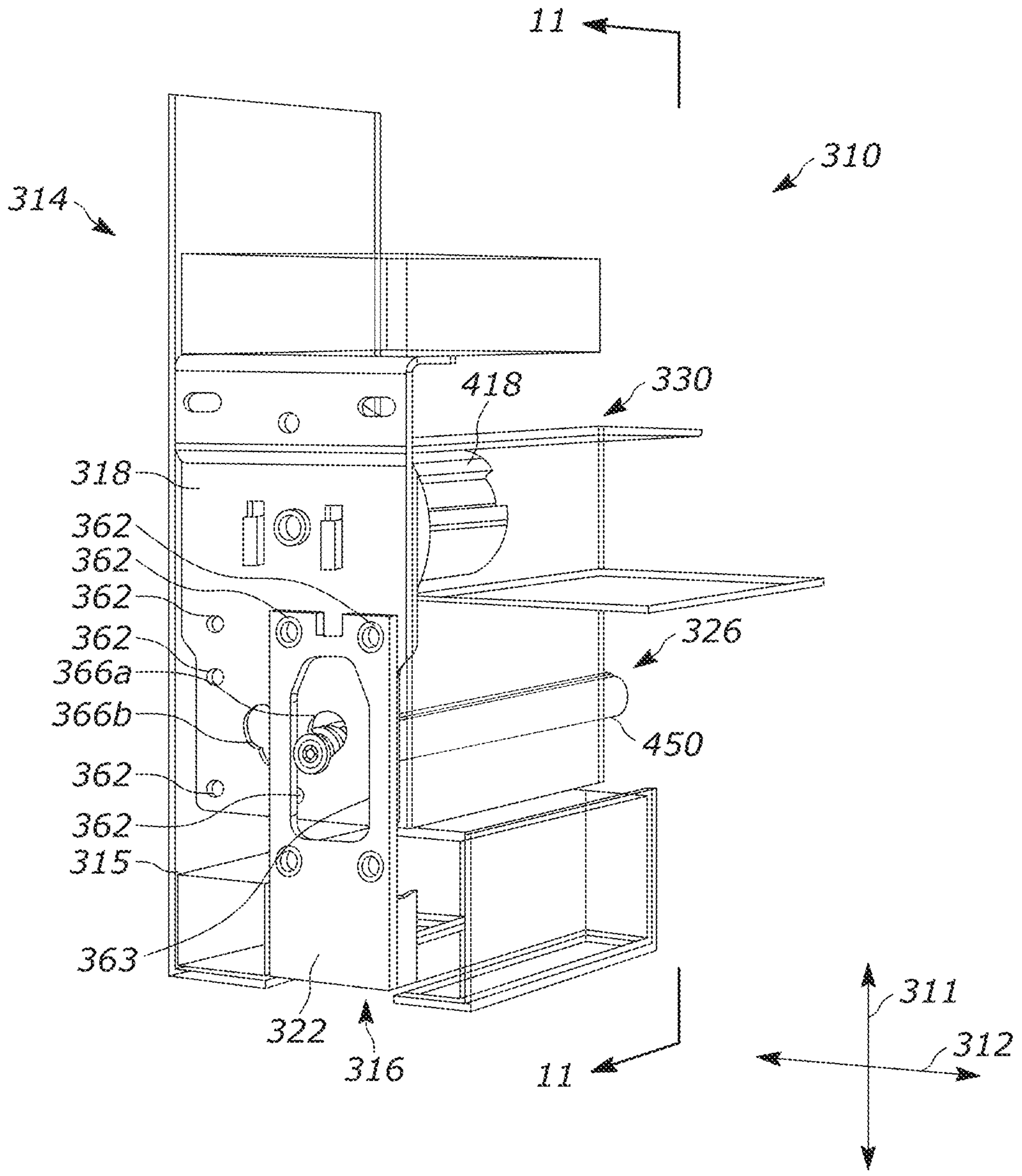
FIG. 10 is a perspective view of a covering including another embodiment of the shade mount assembly.
Figure 11:
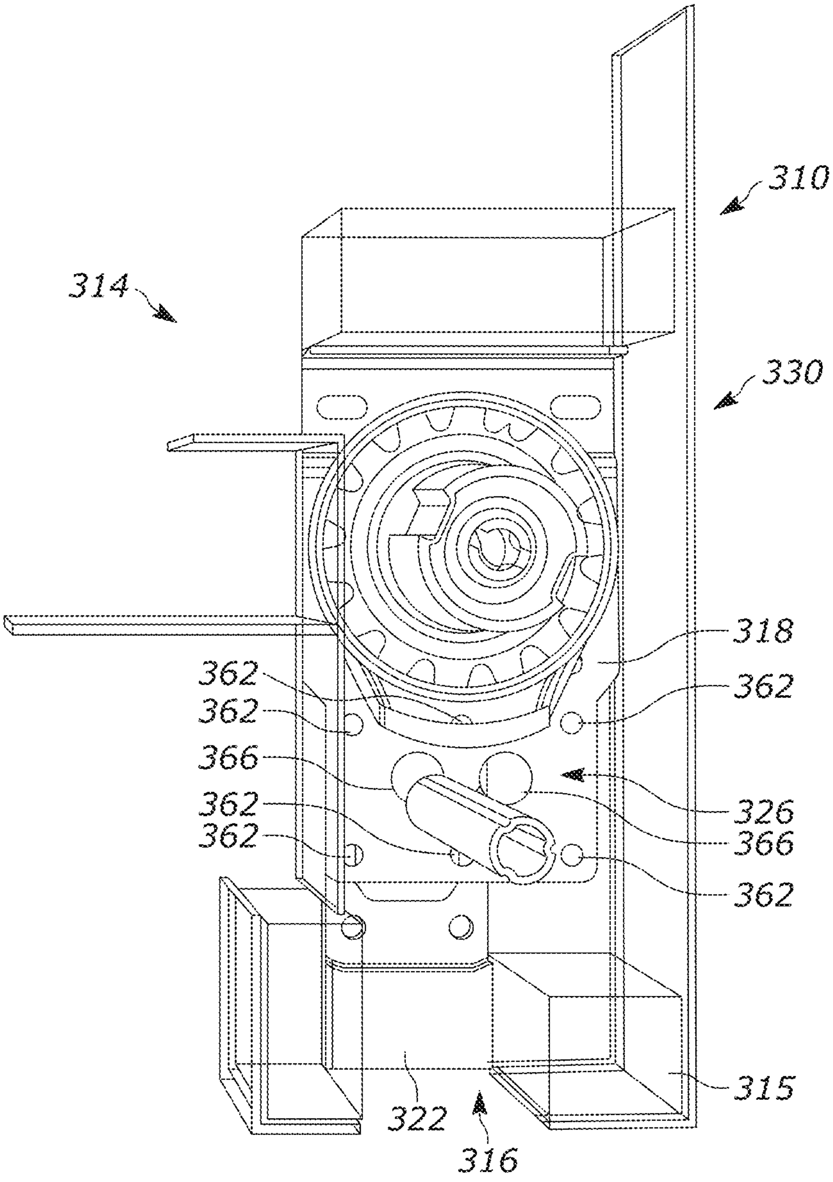
FIG. 11 is a perspective view of the shade mount assembly along line 11-11 of FIG. 10.

The mounting assembly 14 is configured for assembly in, for example, an architectural channel above the architectural opening (see, for example, C-channel 315 of FIGS. 10-11). These channels include an opening (i.e., a slot) (see, for example, opening 316 of FIGS. 10-11) through which the covering extends to cover the architectural opening. In particular, some architectural designs are constrained in such a way that the mounting channel is a compact space. In addition, the channel geometry may vary from building to building or even opening to opening. As such, these mounting channels present specific challenges for mounting a covering. The mounting assembly 14 is also configured for assembly in other types of architectural openings (e.g., a window frame, etc.). The mounting assembly 14 can be mounted within the center of an opening (or a center of the pocket) defined by an architectural opening, even when the mounting space itself may not be centered with respect to the opening (FIGS. 10-11). With the mounting assembly 14, the covering 10 extends through the center of the opening defined by the architectural opening, regardless of length, thereby providing a consistent aesthetic look.

Figure 2:
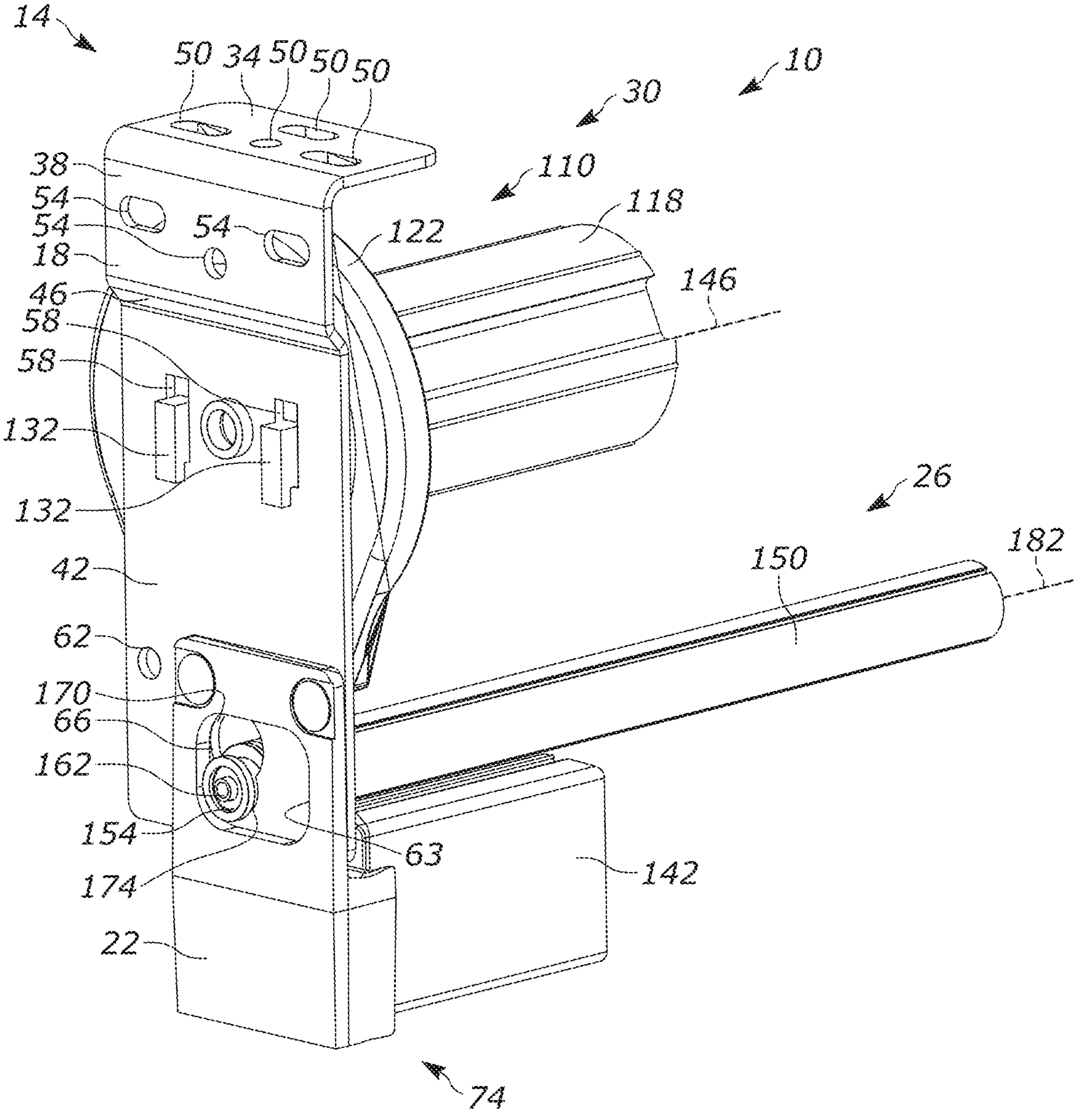
FIG. 2 is another perspective view of the shade mount assembly of FIG. 1 along line 2-2 of FIG. 1.
Figure 3:
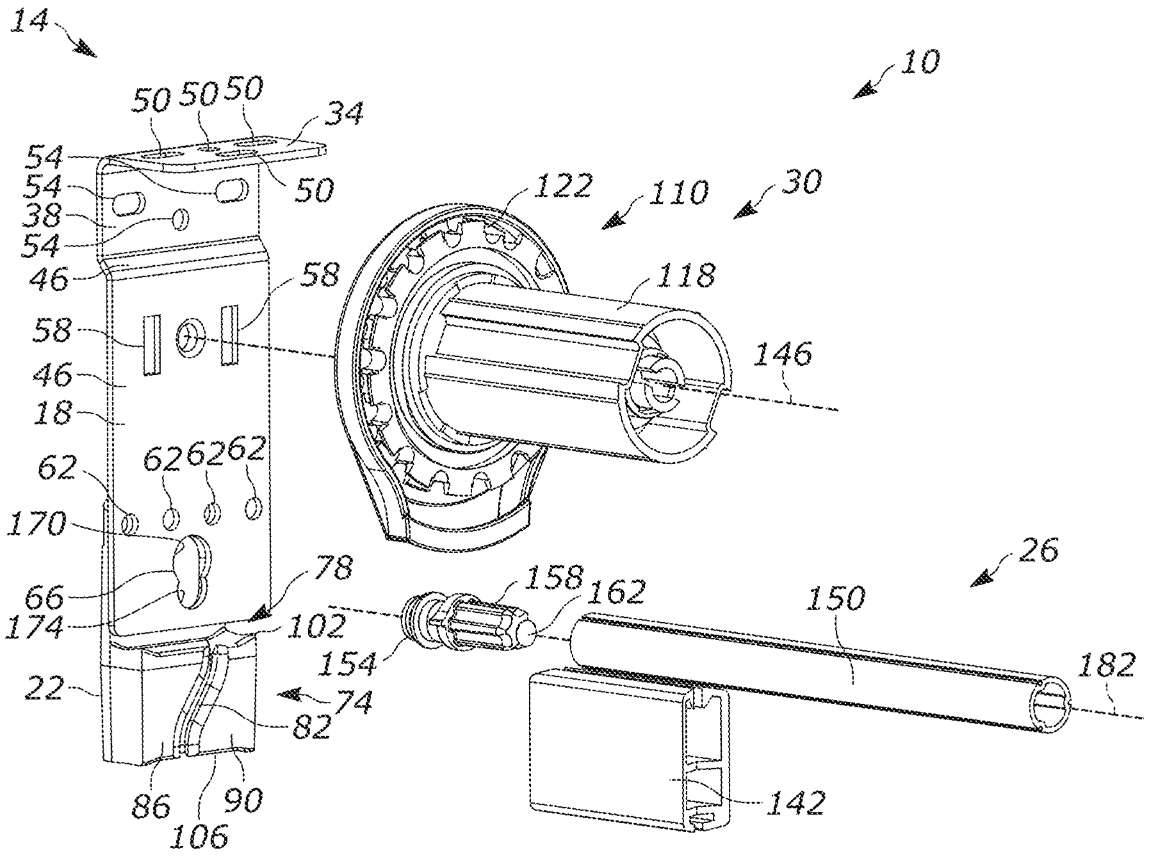
FIG. 3 is an exploded view of the shade mount assembly of FIG. 1.

With reference now to FIGS. 1-3, the bracket 18 includes a first portion 34, a second portion 38, and a third portion 42. The second portion 38 extends between the first portion 34 and the third portion 42. In the illustrated embodiment, the second portion 38 is approximately orthogonal to the first portion 34. The third portion 42 is connected to the second portion 38 by a connecting portion 46 that is angled with respect to both the second portion 38 and the third portion 42. As such, in the illustrated embodiment, the second portion 38 extends offset from and parallel to the third portion 42. While the illustrated connection portion 46 is oblique to the second and third portions 38, 42, in other embodiments, the connection portion 46 can be orthogonal to the second and third portions 38, 42.

With reference to FIGS. 2 and 3, the first portion 34 includes a first plurality of mounting apertures 50, while the second portion 38 includes a second plurality of mounting apertures 54. The first plurality of mounting apertures 50 and the second plurality of mounting apertures 54 are configured to receive a fastener 226 (FIG. 9A) to mount the bracket 18 to an architectural opening. The first plurality of mounting apertures 50 and the second plurality of mounting apertures 54 can be used individually or cooperatively. While a plurality of apertures 50, 54 are shown, additional embodiments can include any number of apertures on either the first portion 34 or the second portion 38. As explained in greater detail below, the third portion 42 of the bracket 18 includes slots 58 for receiving the roller assembly 30, a plurality of positioning apertures 62 for coupling the chain diverter 22 to the bracket 18, and a keyhole 66 for coupling the diverter shaft assembly 26 to the bracket 18.

Figure 4:
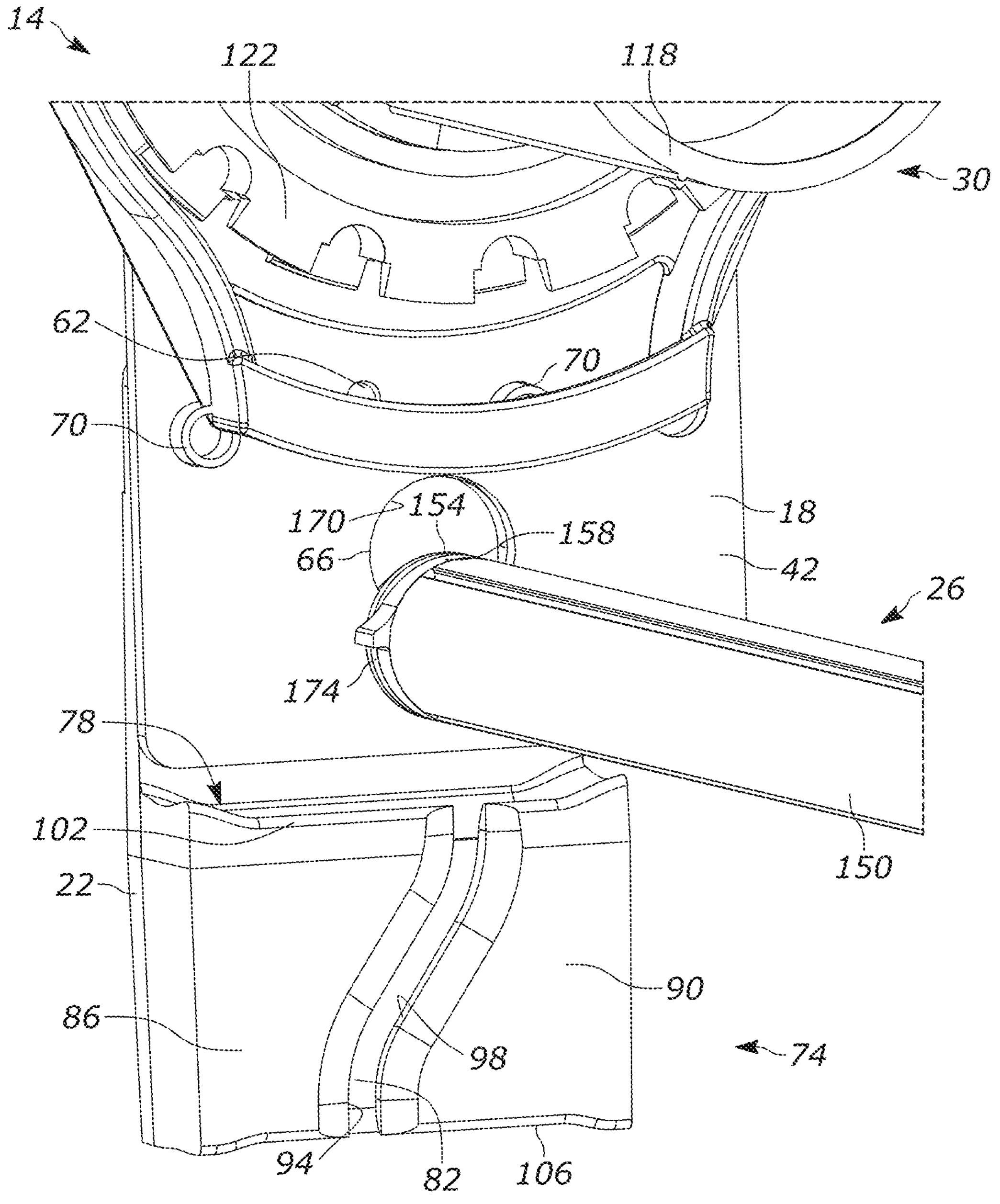
FIG. 4 is an enlarged partial perspective view of the shade mount assembly of FIG. 1 along line 4-4 of FIG. 1 and with a hem bar removed.
Figure 5:
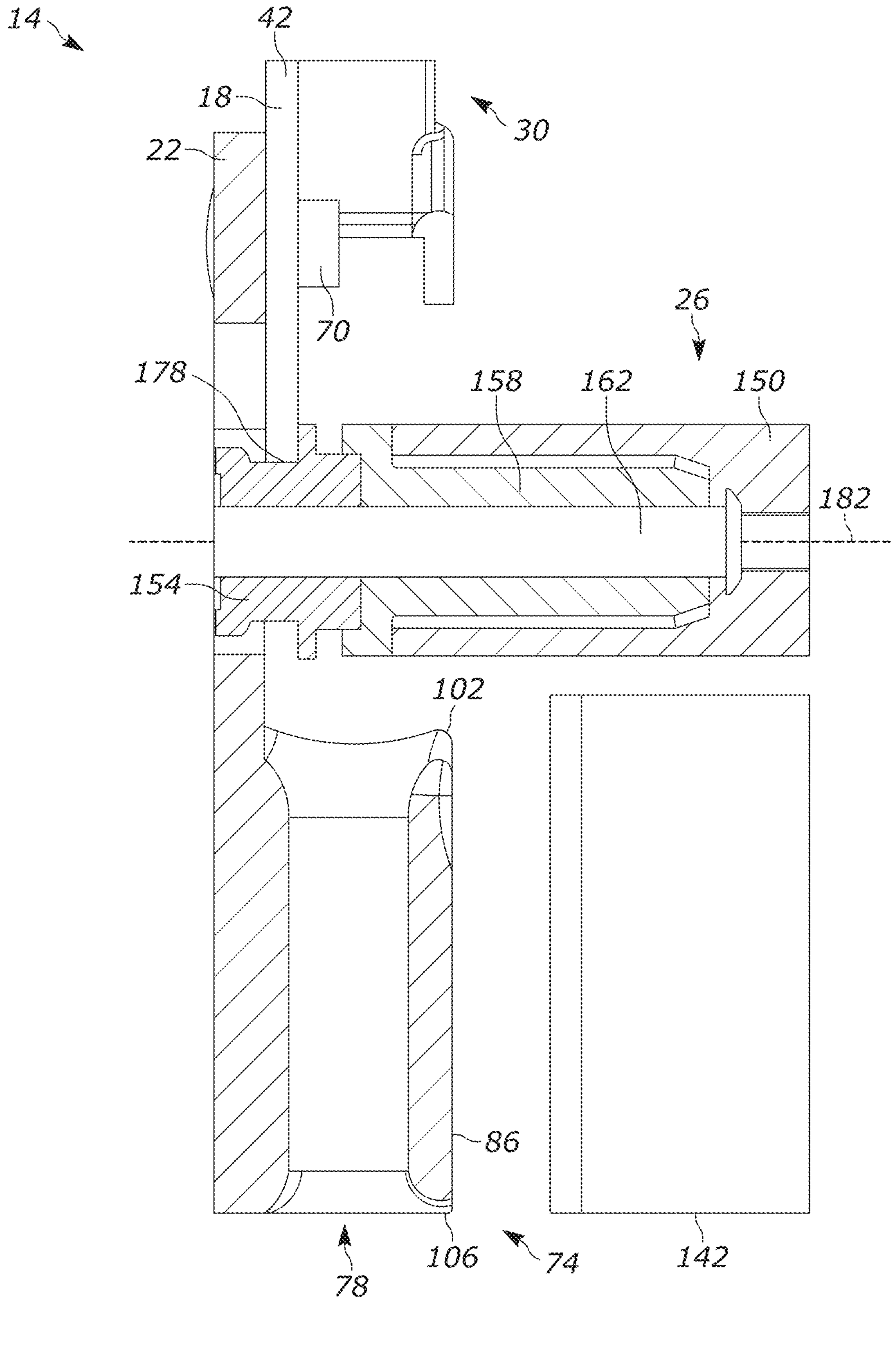
FIG. 5 is a partial cross-sectional view of the shade mount assembly taken along line 5-5 of FIG. 1.
Figure 7:
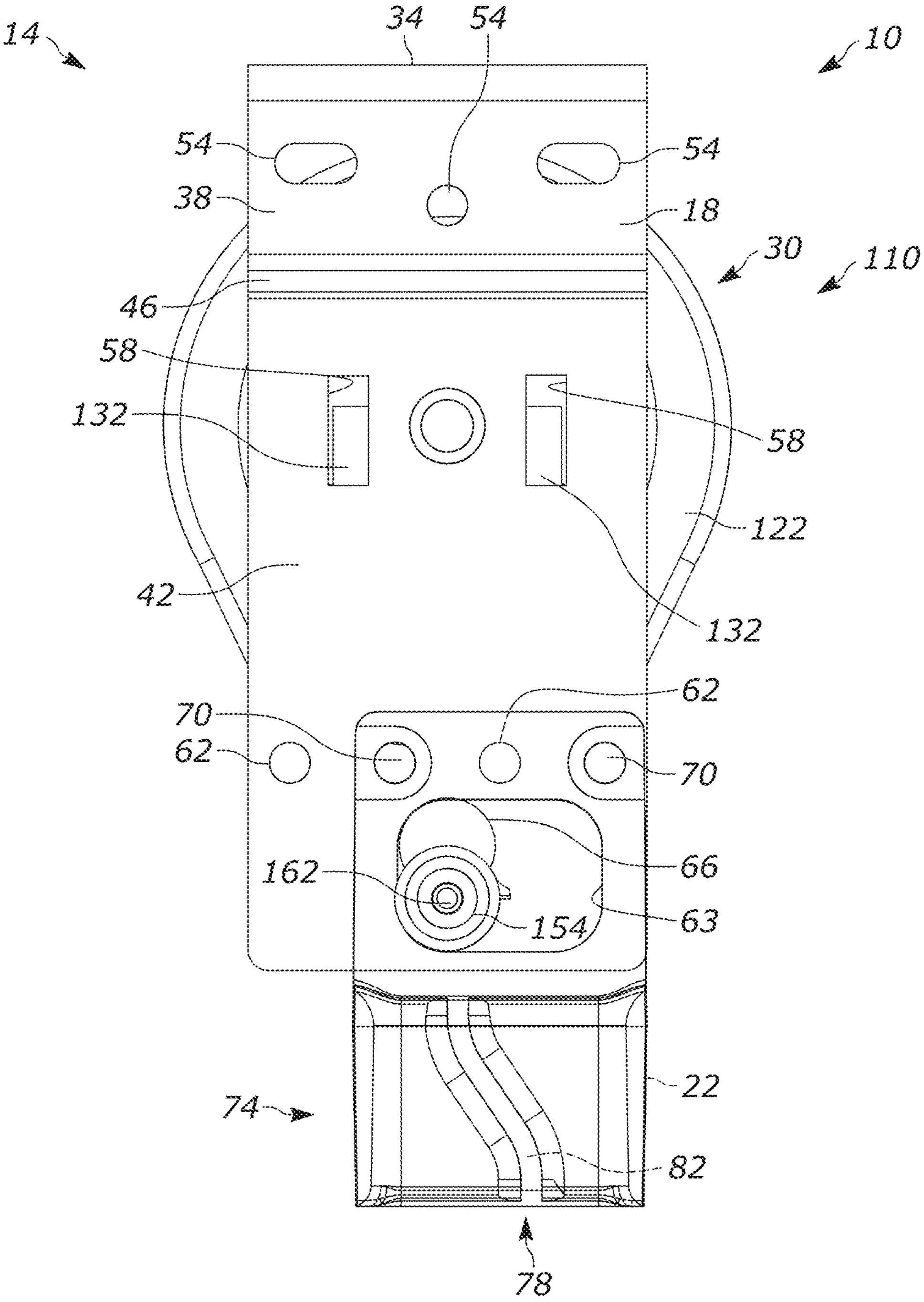
FIG. 7 is another side view of the shade mount assembly of FIG. 1, with a hem bar removed and a chain diverter shown as transparent for clarity.

With reference to FIGS. 4, 5, and 7, the chain diverter 22 is coupled to the bracket 18 by two fasteners 70 (e.g., rivets, projections, etc.). Each fastener 70 passes through one of the plurality of positioning apertures 62. However, not all of the positioning apertures 62 receive a fastener 70, as the additional mounting apertures 62 on the bracket 18 allow the chain diverter 22 to be coupled to the bracket 18 in at least two configurations. In the illustrated embodiment, there are four apertures 62 on the bracket 18 and two of which are used to couple the chain diverter 22 to the bracket 18. As such, the chain diverter 22 in the illustrated embodiment can be positioned relative to the bracket 18 in at least two positions. In a first configuration, the chain diverter 22 is positioned in a forward position (FIG. 2) utilizing two of the four positioning apertures 62. In a second configuration, the chain diverter 22 is positioned in a rearward position (not shown) utilizing the other two of the four positioning apertures 62. Mounting the chain diverter 22 to the positioning apertures 62 associated with the rearward position can be utilized, for example, to ambidextrously mount the chain diverter 22 to the bracket 18 on the opposite side of the mounting assembly 14, where in fact, the “rearward position” would appear as a “forward position.” The chain diverter 22 includes a window 63. The window 63 is elongated so it does not obstruct the keyhole 66, regardless of the position of the chain diverter 22. The flexibility in how and where the chain diverter 22 is coupled to the bracket 18 reduces the number of unique components required for assembly of the mounting assembly 14. In other words, the bracket 18 and the chain diverter 22 are ambidextrous components such that they can be utilizing on either side of the mounting assembly 14. Furthermore, the adjustability allows the bracket 18 and the chain diverter 22 to be utilized in different sized spaces or openings.

With continued reference to FIGS. 4, 5, and 7, the chain diverter 22 includes a guide portion 74 with a slot 78 and a non-linear opening 82. Specifically, the slot 78 is at least partially formed by a first flange 86 and a second flange 90. The first flange 86 includes a first curved edge 94 and the second flange 90 includes a second curved edge 98. The two curved edges 94, 98 are spaced apart to define the non-linear opening 82. The non-linear opening 82 extends from a top edge 102 of the flanges 86, 90 to a bottom edge 106 of the flanges 86, 90. As explained in greater detail below, the guide portion 74 is configured to receive a chain 126 (or continuous loop operated 126) and to maintain the chain 126 in a spaced relationship from any interfering structure.

With reference to FIGS. 1-7, the roller assembly 30 is coupled to the bracket 18. The roller assembly 30 includes a drive assembly 110 (FIG. 9B) and a material roll 114, schematically shown in FIGS. 1, 6A, and 6B. The roller assembly 30 can include additional components, which are not illustrated or shown schematically for purposes of clarity (e.g., the material roll 114, etc.). The drive assembly 110 includes a drive roller 118, a clutch 122, a bead chain 126 (or continuous loop operator 126), and a hold down device 130. With particular reference to FIG. 2, the drive assembly 110 further includes hooks 132 that are received within the slots 78 formed on the bracket 18 in order to couple the roller assembly 30 to the bracket 18.

The material roll 114 (schematically shown in FIG. 1) includes a covering material 134 (e.g., a solar shade material, vinyl shade material, etc.) (FIGS. 6A and 6B) and a tube 138 (FIG. 1) that supports the covering material 134. Specifically, the covering material 134 is coupled to the tube 138 and configured to be wound around and unwound from the tube 138 (e.g., a roller shade, etc.). The material roll 114 can include a roll of window covering material (or shade material), for example a roller shade. A hem bar 142 (see FIGS. 1-3) can be coupled to a bottom edge of the covering material 134. The drive roller 118 is drivingly coupled to the material roll 114 and is operable to rotate relative to the bracket 18 about a first rotational axis 146. In operation, translation of the chain 126 (FIG. 9C) by a user rotates the drive roller 118 through the clutch 122, which causes rotation of the material roll 114. Based on the translational direction of the chain 126 (FIG. 9C), the material roll 114 can either wind or unwind the covering material 134 from the tube 138.

Referring now to FIGS. 3-5, the diverter shaft assembly 26 includes a hollow shaft 150 (i.e., a tube), an end cap 154, an insert 158, and a fastener 162. The end cap 154 is coupled to the insert 158 by the fastener 162, and the insert 158 is received within the hollow shaft 150. The diverter shaft assembly 26 is coupled to the bracket 18 by an interference fit with a portion of the keyhole 66 formed on the bracket 18. In particular, the keyhole 66 includes an enlarged portion 166 and a fitted portion 170. To couple the shaft assembly 26 to the bracket 18, the end cap 154 is first inserted through the enlarged portion 170 of the keyhole 66 and then translated into the fitted portion 174. With particular reference to FIG. 5, the end cap 154 includes a grooved section 178 that is received within the fitted portion 174 of the keyhole 66. The end cap 164 does not rotate with respect to the bracket 18, but the insert 158 and the shaft 150 rotate about a rotational axis 182 (shown in FIGS. 1-3 and 5) defined by the fastener 162. In other words, the insert 158 and the shaft 150 rotate relative to the end cap 154 and the bracket 18 along the rotational axis 182. In the illustrated embodiment, the rotational axis 182 of the shaft 150 is offset from the rotational axis 146 of the drive roller 118 in at least two directions (i.e., vertically and horizontally) (FIG. 2). In other embodiments, the rotational axis 182 of the shaft 150 can be offset from the rotational axis 146 of the drive roller 118 in one direction (e.g., vertically, or spaced apart along a vertical axis 311 (FIG. 10), etc.) and aligned with the rotational axis 146 of the drive roller 118 in one direction (e.g., not offset horizontally along a horizontal axis 312 (FIG. 10), or in alignment along the vertical axis 311 (FIG. 10), etc.). In some embodiments, the diverter shaft assembly 26 is utilized in applications that do not require a chain or chain diverter (e.g., motorized shade applications). In particular, the diverter shaft assembly 26 can be utilized in a motorized shade, which would not need a chain and therefore would not need a chain diverter.

Figure 6A:
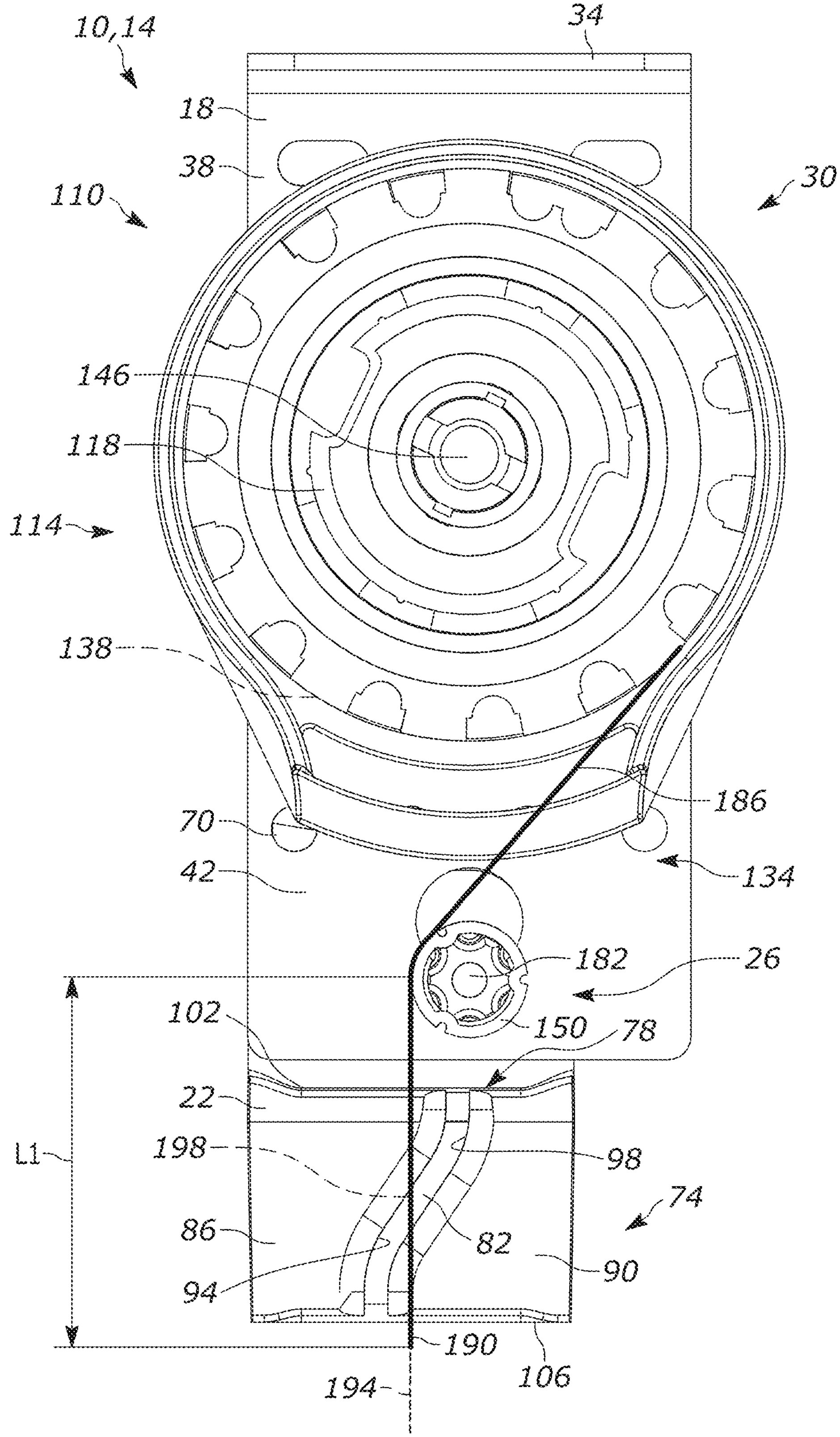
FIG. 6A is a side view of the covering of FIG. 1, with a covering material extending a first distance.
Figure 6B:
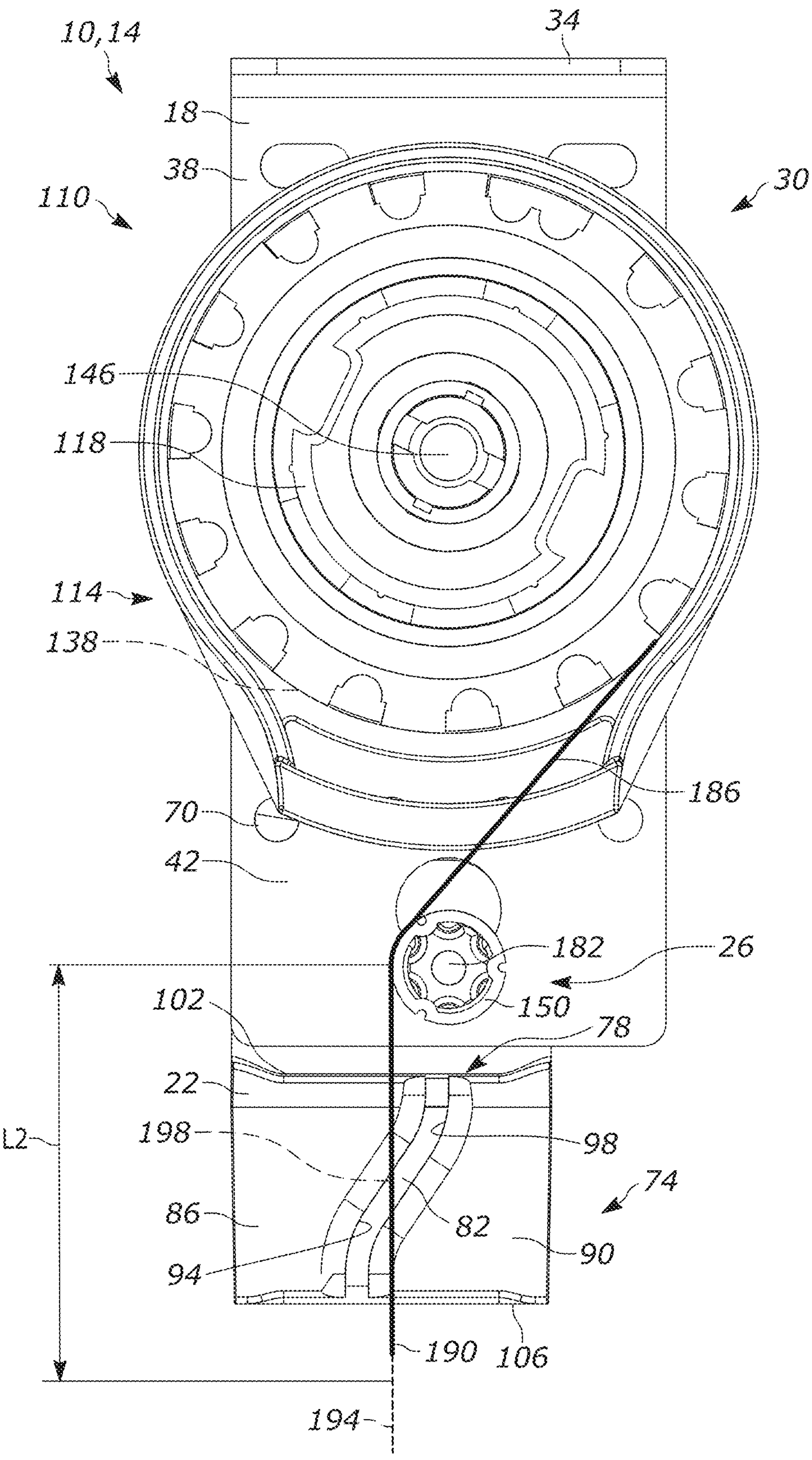
FIG. 6B is a side view of the covering of FIG. 1, with a covering material extending a second distance.

With reference to FIGS. 6A and 6B, the covering material 134 includes a first portion 186 that extends between the material roll 114 and the shaft 150. The covering material 134 further includes a second portion 190 that extends from the shaft 150 and extends within a plane 194. The first portion 186 and the second portion 190 of the covering material 134 form a continuous, uninterrupted length of material. In other words, material passes from the first portion 186 to the second portion 190 as the covering material 134 unwinds from the tube 138, and likewise, material passes from the second portion 190 to the first portion 186 as the covering material 134 winds around the tube 138. The second portion 190 of the covering material 134 may be a first length L1 (FIG. 6A) that extends within the plane 194, or may be a second length L2 (FIG. 6B) that also extends within the plane 194. In other words, the covering material 134 includes the second portion 190 that extends from the shaft 150 in the plane 194, regardless of the length the second portion 190 extends from the shaft 150. In the illustrated embodiment, the shaft 150 at least partially defines the plane 194, with the plane 194 being tangential to an outer diameter of the shaft 150 (or defined by a portion of the circumference of the shaft 150). This provides greater control and consistency of placing the covering material 134 and offers improved aesthetics by centering the covering material in the architectural opening as compared to conventional shades. In other words, the covering material in conventional coverings can shift where the covering material hangs (i.e., laterally shifts front to back, or perpendicular to plane 194) with respect to the architectural opening depending on how much covering material is paid out (or unwound from the tube 138), which can be visibly noticeable and not aesthetically pleasing. In addition to an aesthetic improvement, precise control of the placement (or position) of the covering material 134 within the architectural opening reduces the size of the opening required to accommodate the covering 10.

With continued reference to FIGS. 6A and 6B, the chain diverter 22 defines a centerline 198 that extends within the plane 194, which can be coplanar with the second portion 190 of the covering material 134. The chain diverter 22 can be mounted within the center of an opening (or center of the pocket) defined by the architectural opening, even when the bracket 18 itself may not be centered relative to the opening (see FIGS. 10-11). As such, the covering material 134 extends through the center of the opening defined by the architectural opening after contacting the diverter shaft assembly 26, regardless of length, thereby providing a consistent aesthetic look. The mounting assembly 14 also consistently positions the covering material 134 in a centered position for a variety of different sized and shaped architectural openings. The positional adjustability of the mounting assembly 14 advantageously improves aesthetics for different sized and shaped architectural openings.

Figure 8:
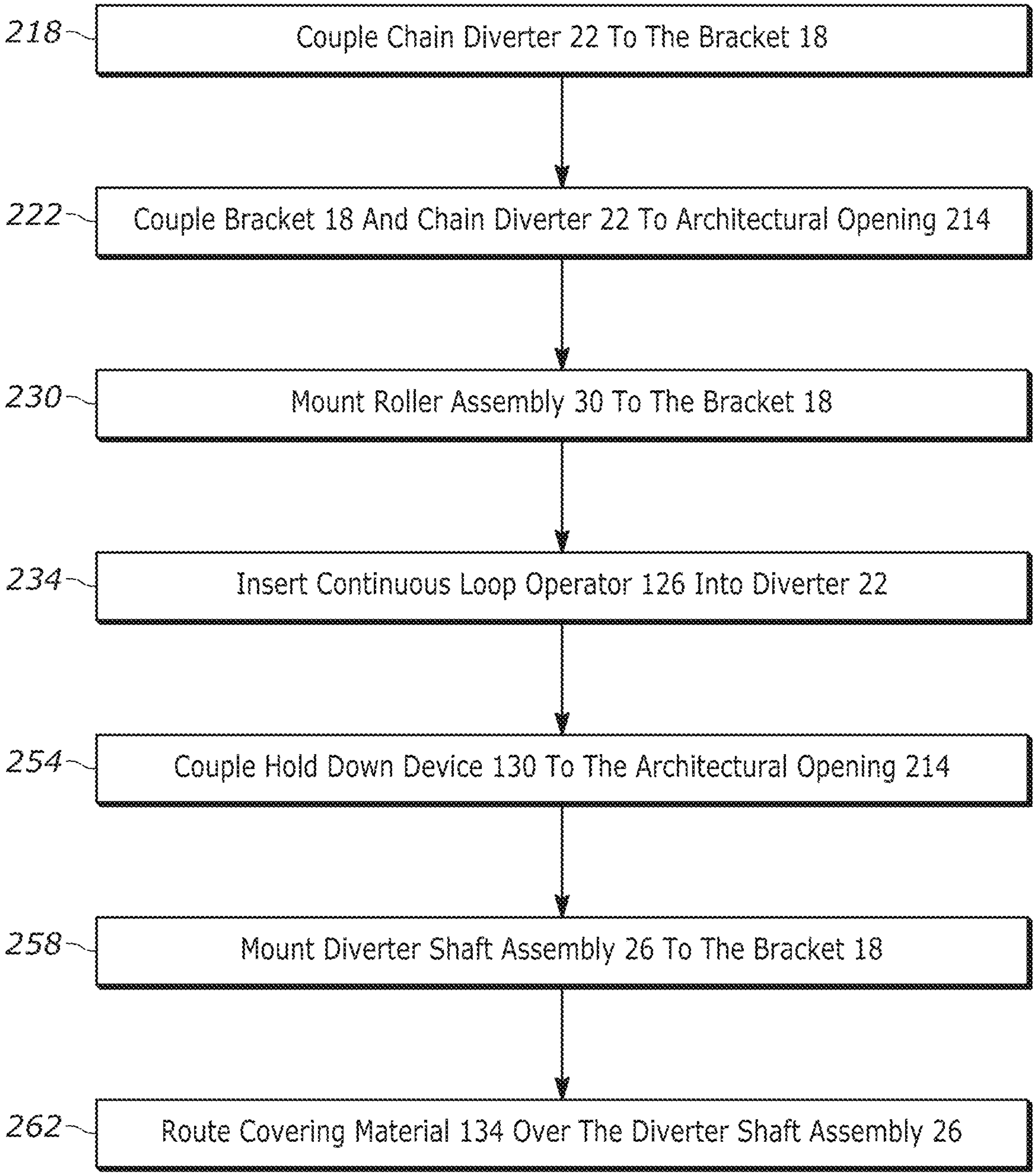
FIG. 8 is a flow chart of a method for installing the shade mount assembly of FIG. 1.

With reference to FIGS. 8 and 9A-9I, a method 210 of installing the covering 10 in an architectural opening 214 is illustrated. The mounting assembly 14 and the method 210 of installing provide certain advantages, explained below, that improve the safety, reliability, cost, and flexibility of the covering 10. With reference to FIG. 8, the method 210 includes step 218, by coupling the chain diverter 22 to the bracket 18 (e.g., via rivets 70). As explained above, the chain diverter 22 may be coupled to the bracket 18 in at least two configurations, such that the same bracket 18 and the same chain diverter 22 can be used on both sides of the mounting assembly 14.

Figure 9A:
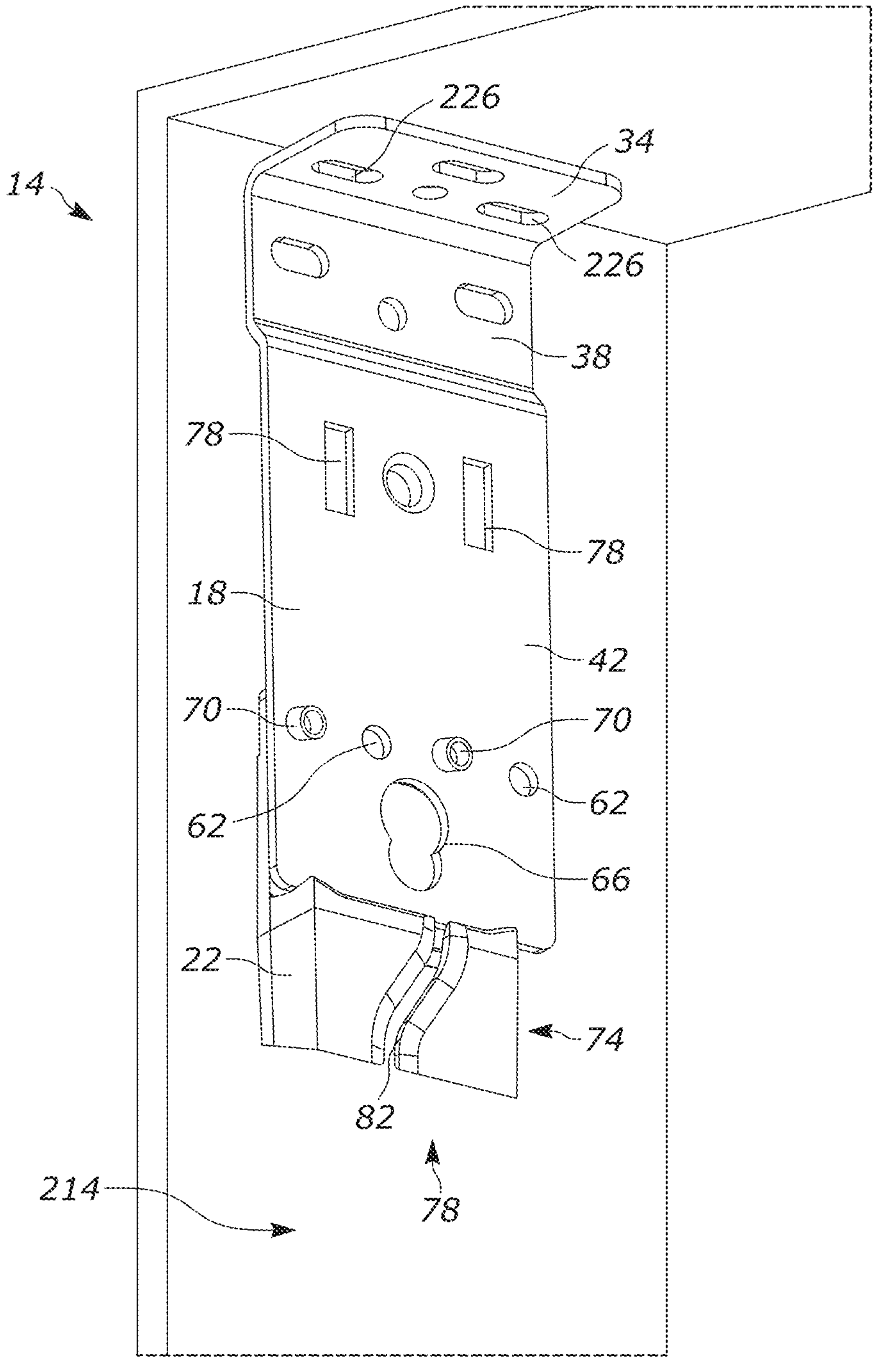
FIGS. 9A-9I are photographs illustrating the method of FIG. 8.

Next, at step 222, the bracket 18 and the chain diverter 22 are coupled to the architectural opening 214. As shown in FIG. 9A, the first portion 34 of the bracket 18 is coupled to the architectural opening 214 via fasteners 226.

Figure 9B:
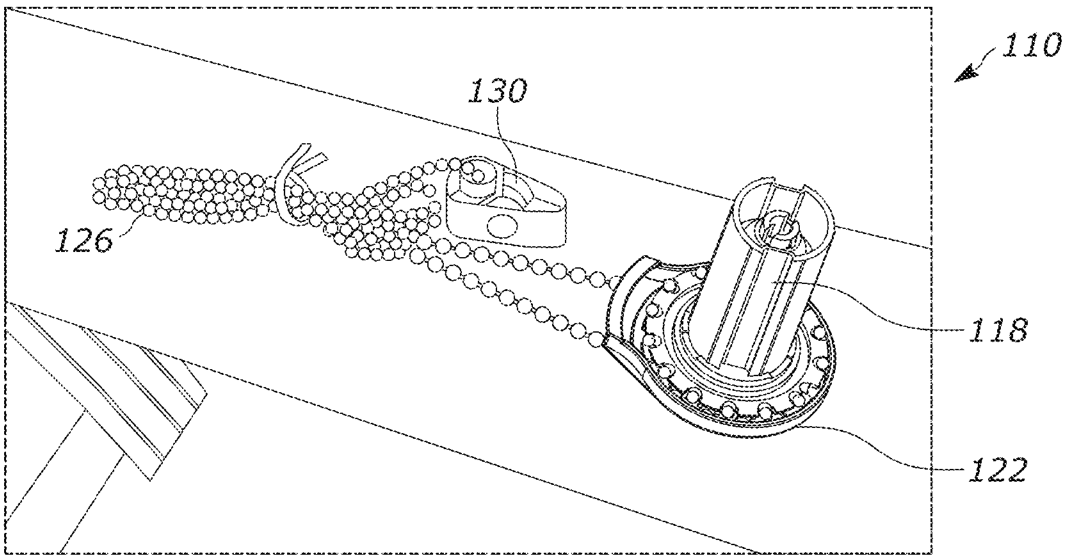
Figure 9C:
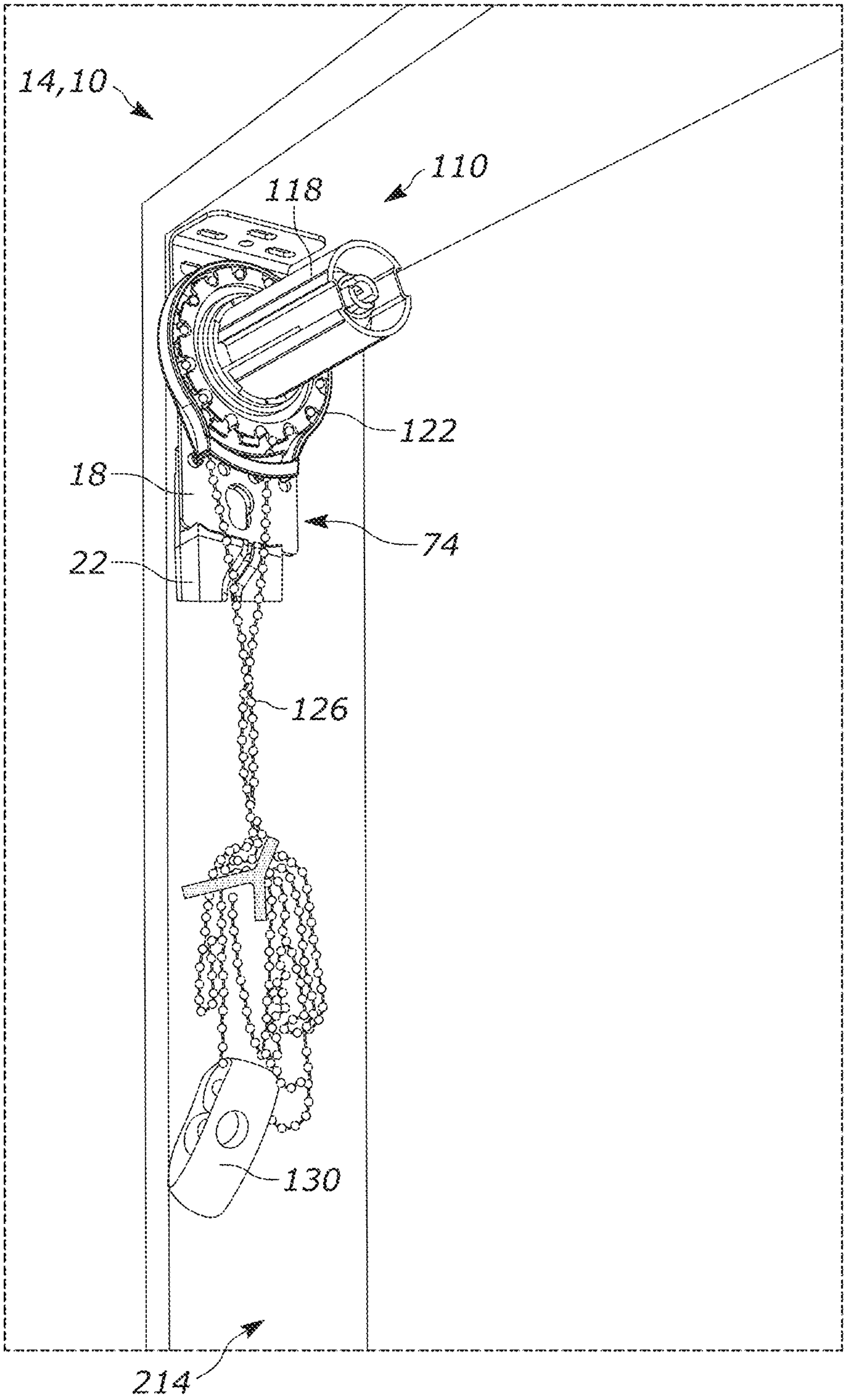

At step 230, the roller assembly 30 is mounted to the bracket 18 (FIG. 9C). The drive assembly 110 (shown in FIG. 9B) is coupled to the bracket 18 by the hooks 132 (shown FIG. 7). The material roll 114 is then coupled to the drive assembly 110. In other embodiments, step 230 can include coupling the drive assembly 110 to the bracket 18, with the material roll 114 being coupled to the drive assembly 110 at a later point in the installation method (for example after step 254).

Figure 9D:
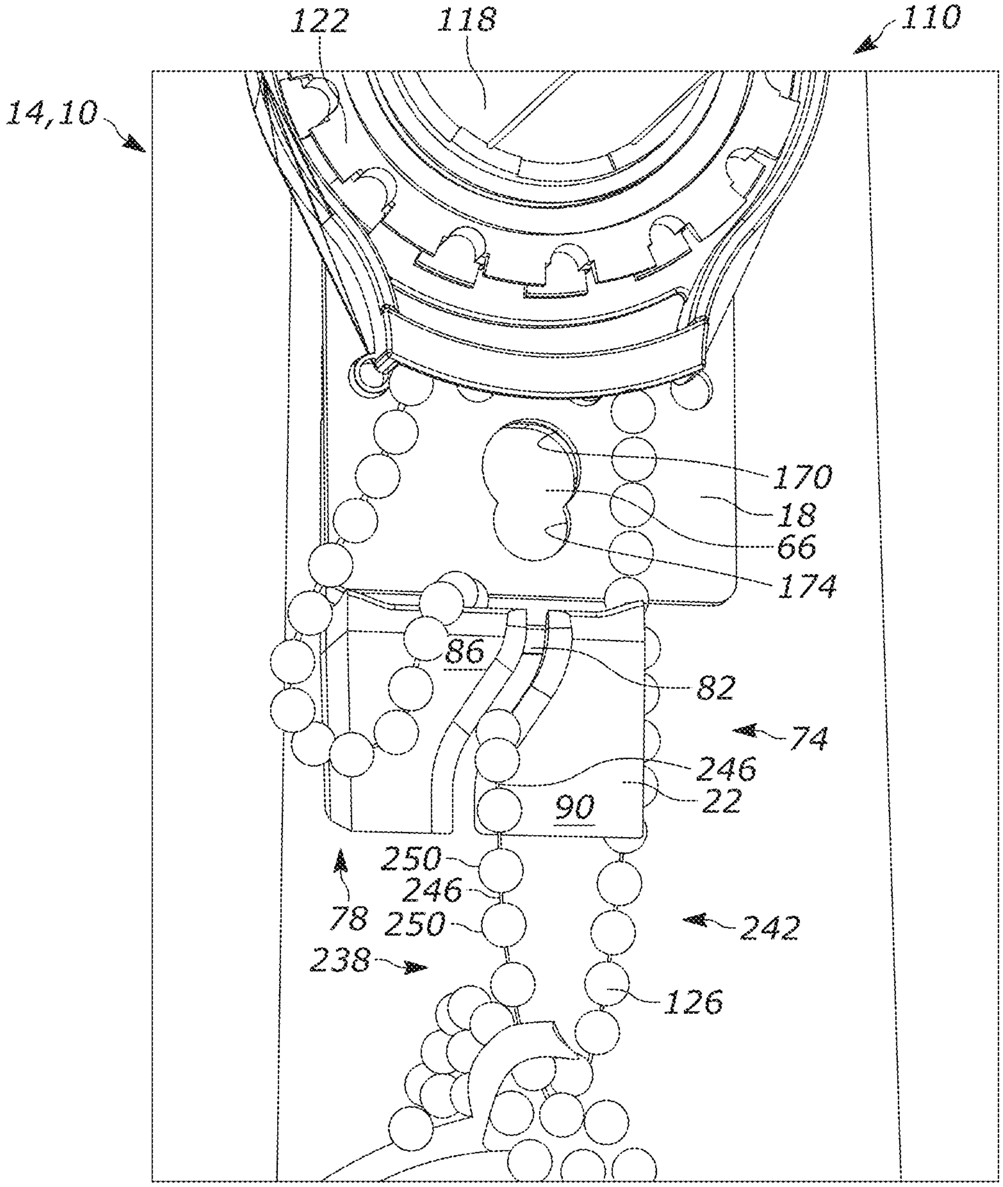
Figure 9E:
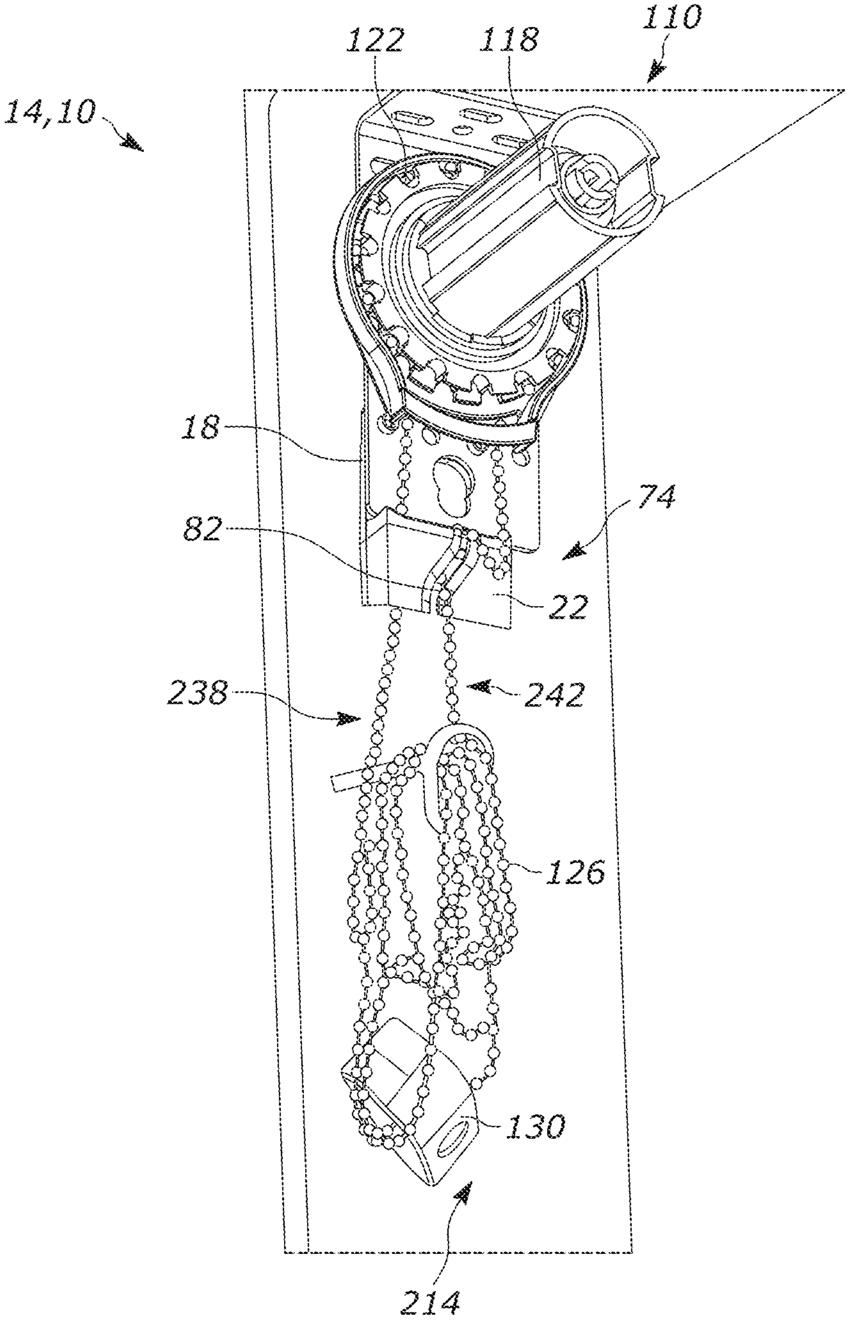
Figure 9F:
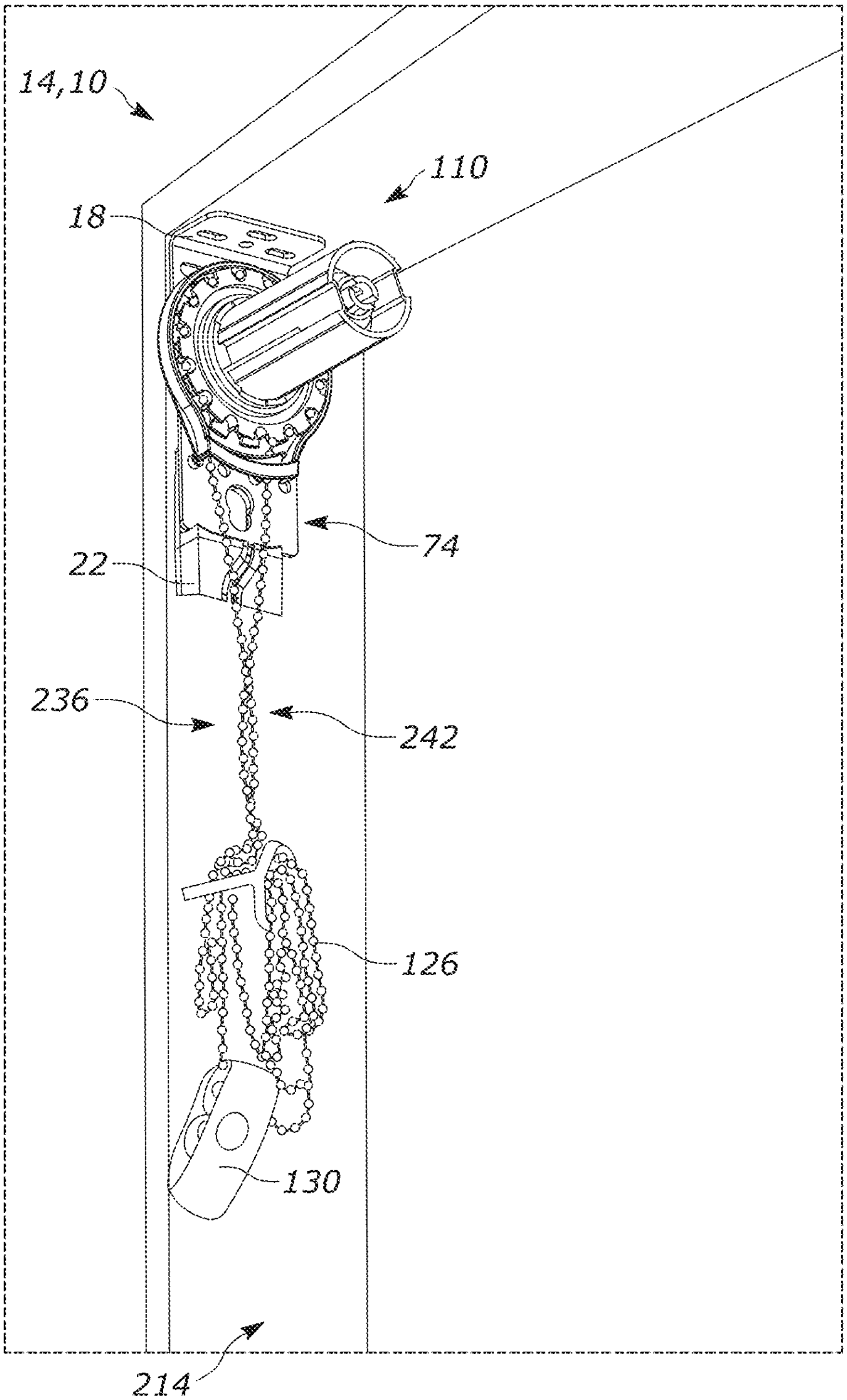

Next, at step 234 the continuous loop operator 126 (or chain 126) is inserted into the diverter 22. In embodiments where the continuous loop operator 126 is a chain 126, the chain 126 is generally inserted into the diverter 22 after the chain 126 is formed into a complete, continuous loop. As shown in FIG. 9B, prior to insertion into the diverter 22, the continuous loop operator 126 can be engaged with the hold down device 130. An example of the hold down device 130 is disclosed in U.S. Pat. No. 9,663,988, the content of which is hereby incorporated by reference in its entirety. With reference to FIG. 9D, a leading portion 238 of the continuous loop operator 126 is inserted into the diverter 22. With reference to FIG. 9E, a trailing portion 242 of the continuous loop operator 126 is then inserted into the chain diverter 22. In the illustrated embodiment where the continuous loop operator 126 is the chain 126, the chain 126 is inserted into the diverter 22 by passing a spacing 246 between adjacent chain balls 250 through the non-linear opening 82 formed in the guide portion 74 of the chain diverter 22. Once the chain 126 passes through the non-linear opening 82, the chain 126 is retained within the slot 78. FIG. 9F illustrates the completed step 234, with both the leading portion 238 and the trailing portion 242 of the chain loop 126 being positioned within the chain diverter 22.

With continued reference to FIGS. 9E-9F, the geometry of the non-linear opening 82 prevents the continuous loop operator 126 (or chain 126) from inadvertently leaving the slot 78 during operation. In other words, the chain 126 may be simply inserted into and removed from the guide portion 74 when desired, but is otherwise prevented from leaving the guide portion 74 during normal operation. At the same time, the chain diverter 22 positions the chain 126 in a forward-most position for ease of access by a user and to also space the chain 126 from any interfering structure (e.g., the covering material 134). This improved spacing of the chain 126 helps reduce the wear of the chain 126 and any potentially interfering structure, and reduces the tendency of the chain 126 to become free from the clutch 122.

Figure 9G:
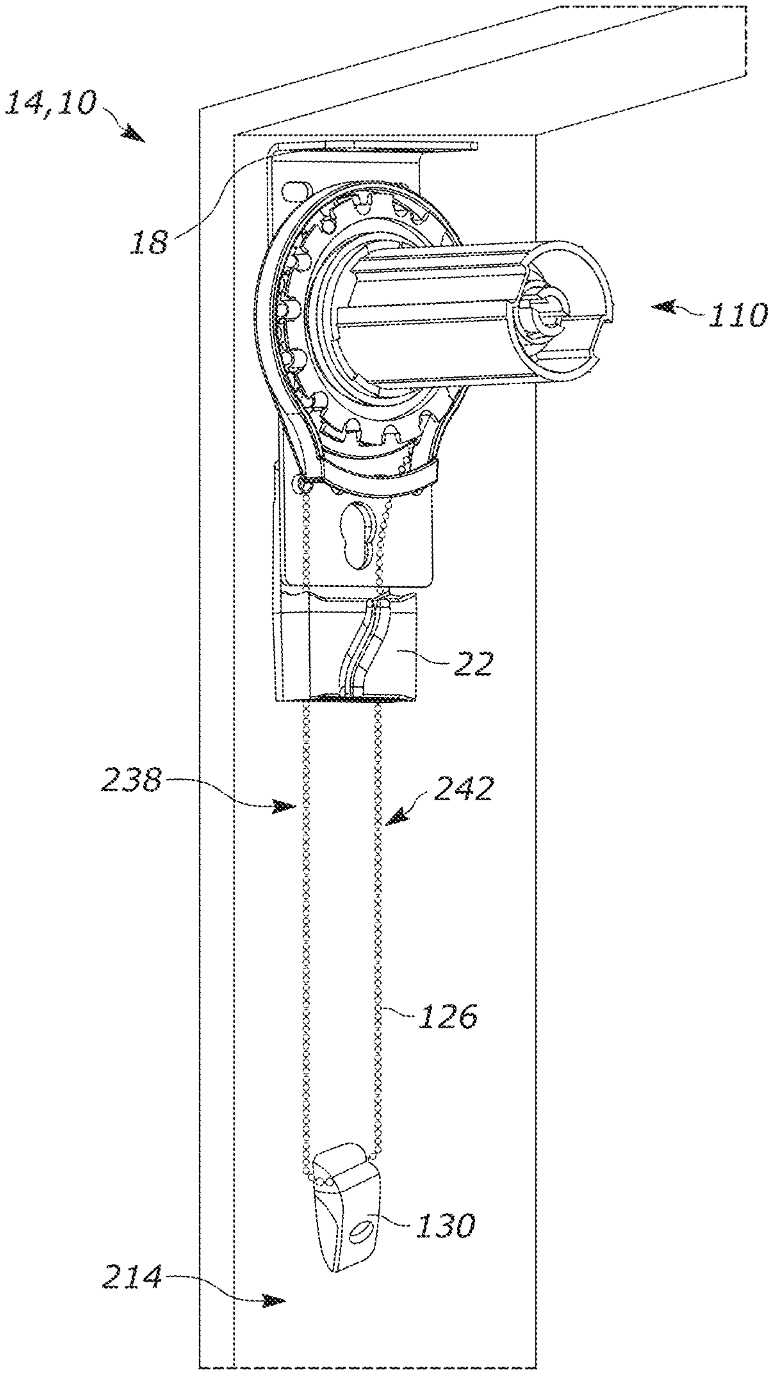

Next at step 254, the hold down device 130 is coupled to the architectural opening 214 (FIG. 9G). The hold down device 130 is provided as a safety feature to prevent unintentional entanglement in the chain 126. The mounting assembly 14 and the method 210 advantageously allows for assembly of the covering 10 while the chain 126 is maintained in a complete loop. In this way, the hold down device 130 does not need to be removed from the chain 125 during installation. For example, an installer may physically remove the chain hold-down from engagement with the chain during installation, and then fail to reattach once completed. In other words, for conventional coverings, the chain loop must be broken (i.e., separated) by an installer in order to complete installation. By breaking the chain loop during installation, the risk that the chain hold-down may not be installed in increased. In contrast, the driving assembly 110 of the present invention can be provided as a single assembly (FIG. 9B) that includes the hold down device 130 on the complete chain loop 126, which does not need to be broken in order to complete installation. As a result, safety is improved by ensuring the hold down device 130 remains in engagement with the chain 126 during installation.

Figure 9H:
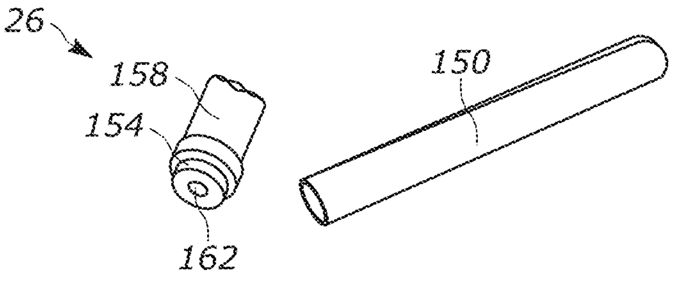
Figure 9I:
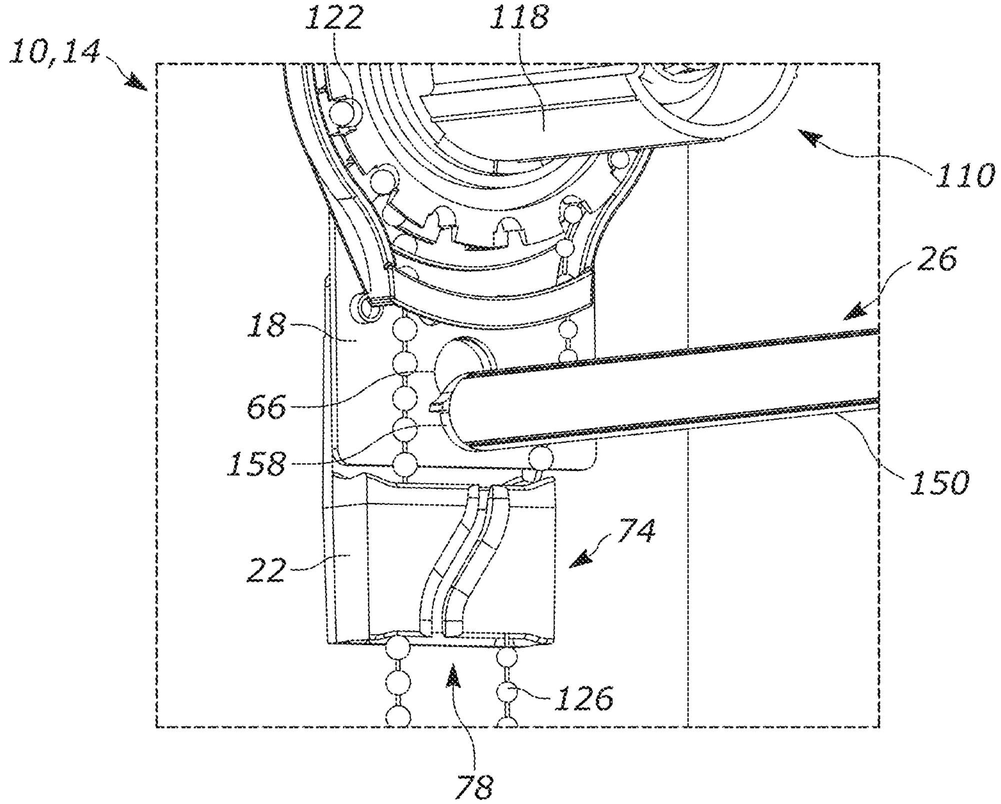

At step 258, the diverter shaft assembly 26 is mounted to the bracket 18. FIG. 9H illustrates the diverter shaft assembly 26 with the end cap 154 and the insert 158 removed from the shaft 150. FIG. 9I illustrates the completion of step 258, with the diverter shaft assembly 26 mounted within the keyhole 66 formed in the bracket 18. As described above, mounting the diverter shaft assembly 26 includes inserting the end cap 154 into the enlarged section 170 and then translating the end cap 154 into the fitted section 174 of the keyhole 66.

Next, at step 262 the covering material 134 is routed over the diverter shaft assembly 26. In other words, the covering material 134 is routed from the material roll 114 to contact or otherwise pass over the diverter shaft 150. Once past the diverter shaft assembly 26, the covering material 134 extends from the shaft 150 within the fixed plane 194, which is centrally aligned with respect to the architectural opening, regardless of length.

FIGS. 10-12C illustrate another embodiment of a covering 310 (e.g., a window shade) including a mounting assembly 314 for mounting the covering 310 within an architectural opening (e.g., a window, a C-channel, etc.). The covering 310 is substantially similar to covering 10, and only the differences are described herein, with similar structure referenced with the same reference numerals incremented by "300" (e.g., 14 and 314 both reference the mounting assembly, etc.).

With reference to FIGS. 10 and 11, the mounting assembly 314 includes a bracket 318, a chain diverter 322, and a diverter shaft assembly 326. As before, the mounting assembly 314 supports a roller assembly 330. The covering 310 is illustrated mounted within a C-channel 315 that defines an opening 316, with which the chain diverter 318 is centered. The bracket 318 includes two different keyholes 366*a, b* to receive the diverter shaft assembly 326 in two potential, different configurations (e.g., positions along a second direction 312). The bracket 318 also includes nine positioning apertures 362 for selectively coupling the chain diverter 322 in at least six different positions. More specifically, the chain diverter 322 can be adjustably mounted to the bracket 318 in both a first direction 311 (i.e., vertically) and the second direction 312 (i.e., horizontally forward or aft). In the illustrated embodiment, the second direction 312 is orthogonal to the first direction 311.

Figure 12A:
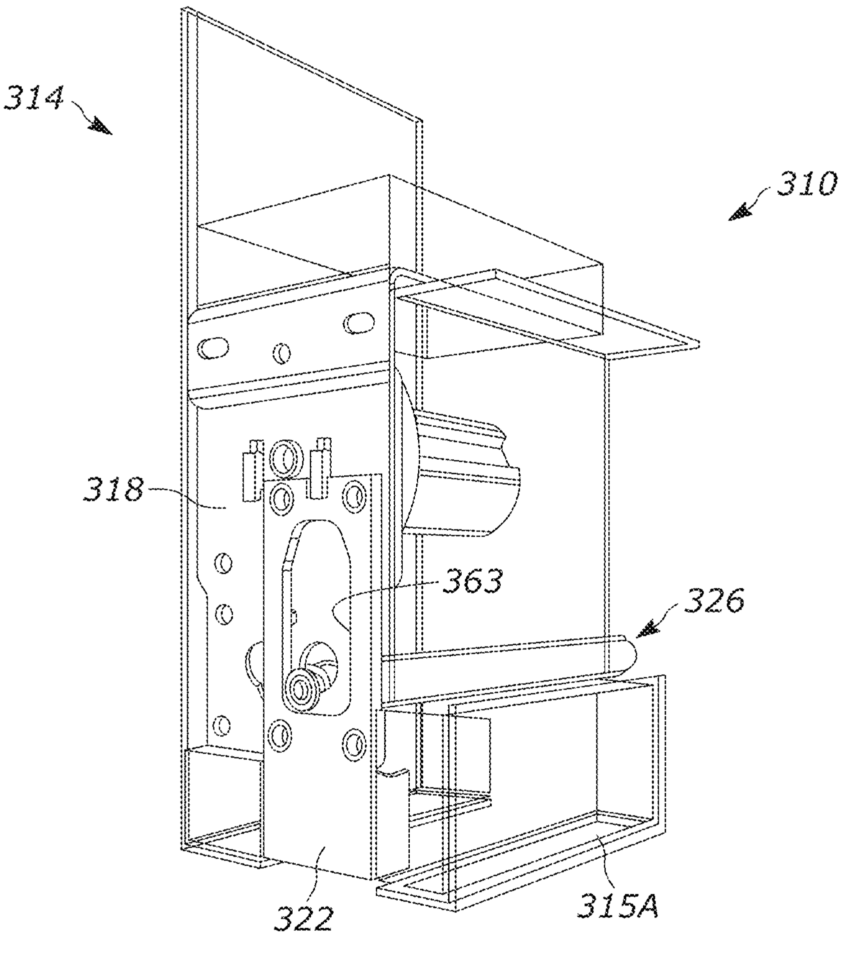
FIG. 12A is a perspective view of the shade mount assembly of FIG. 10 in a first configuration.
Figure 12B:
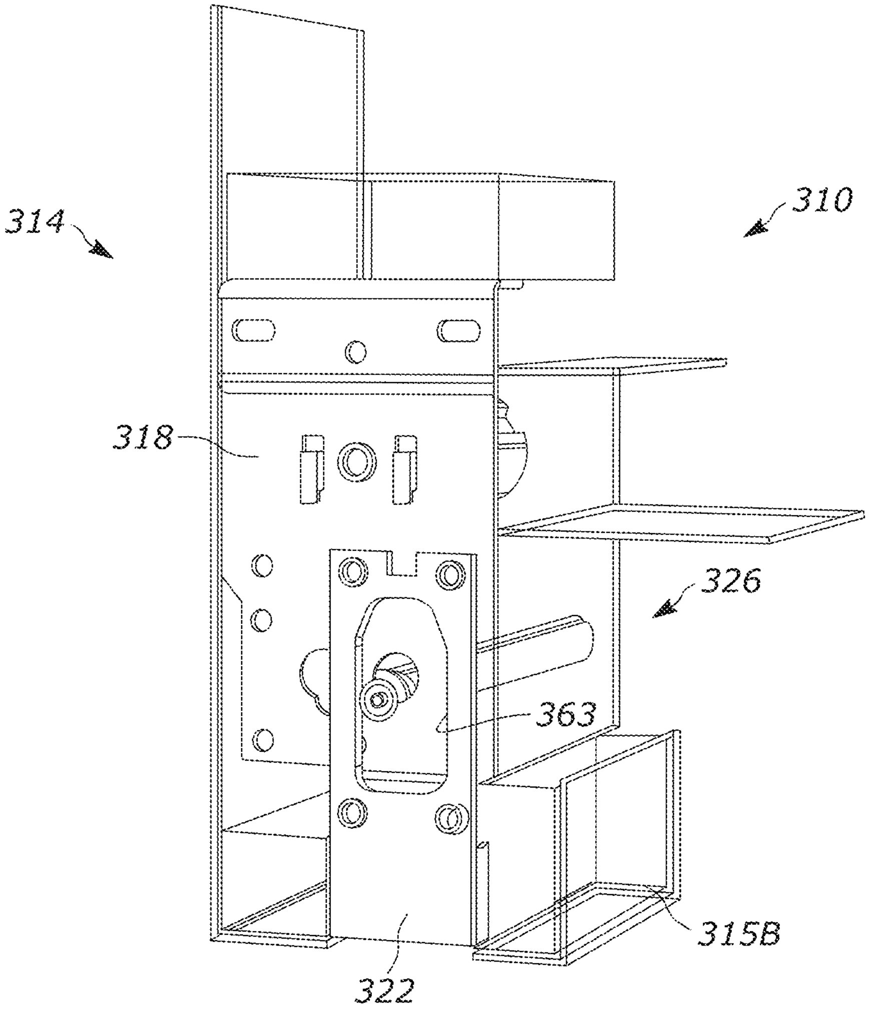
FIG. 12B is a perspective view of the shade mount assembly of FIG. 10 in a second configuration.
Figure 12C:
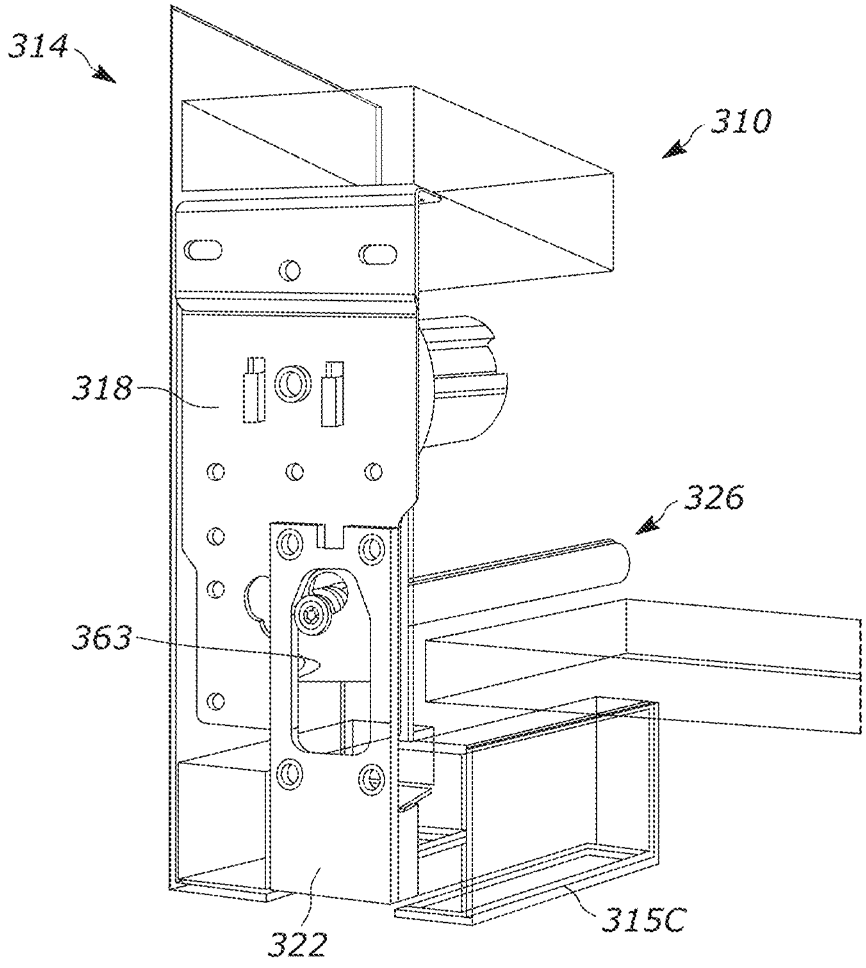
FIG. 12C is a perspective view of the shade mount assembly of FIG. 10 in a third configuration.

With reference to FIGS. 12A-12C, three of the six possible positions for the chain diverter 322 are illustrated for three different C-channels 315A-315C. In particular, the three height-adjustable positions for the chain diverter 322 are shown in FIGS. 12A-12C, with FIG. 12A showing the highest mounting position for C-channel 315A, FIG. 12B showing an intermediate position for C-channel 315B, and FIG. 12C showing the lowest mounting position for C-channel 315C. The remaining three positions (not shown) are mirror images of the positions in FIGS. 12A-12C for positioning on the opposite side of the architectural opening. More specifically, the chain diverter 322 is positioned relative to the bracket 318 such that a window 363 of the chain diverter 322 is aligned with the other keyhole 366*b*, and the mounting apertures on the chain diverter 322 are aligned with the positioning apertures 362 on either side of the keyhole 366*b*.

Figure 13:
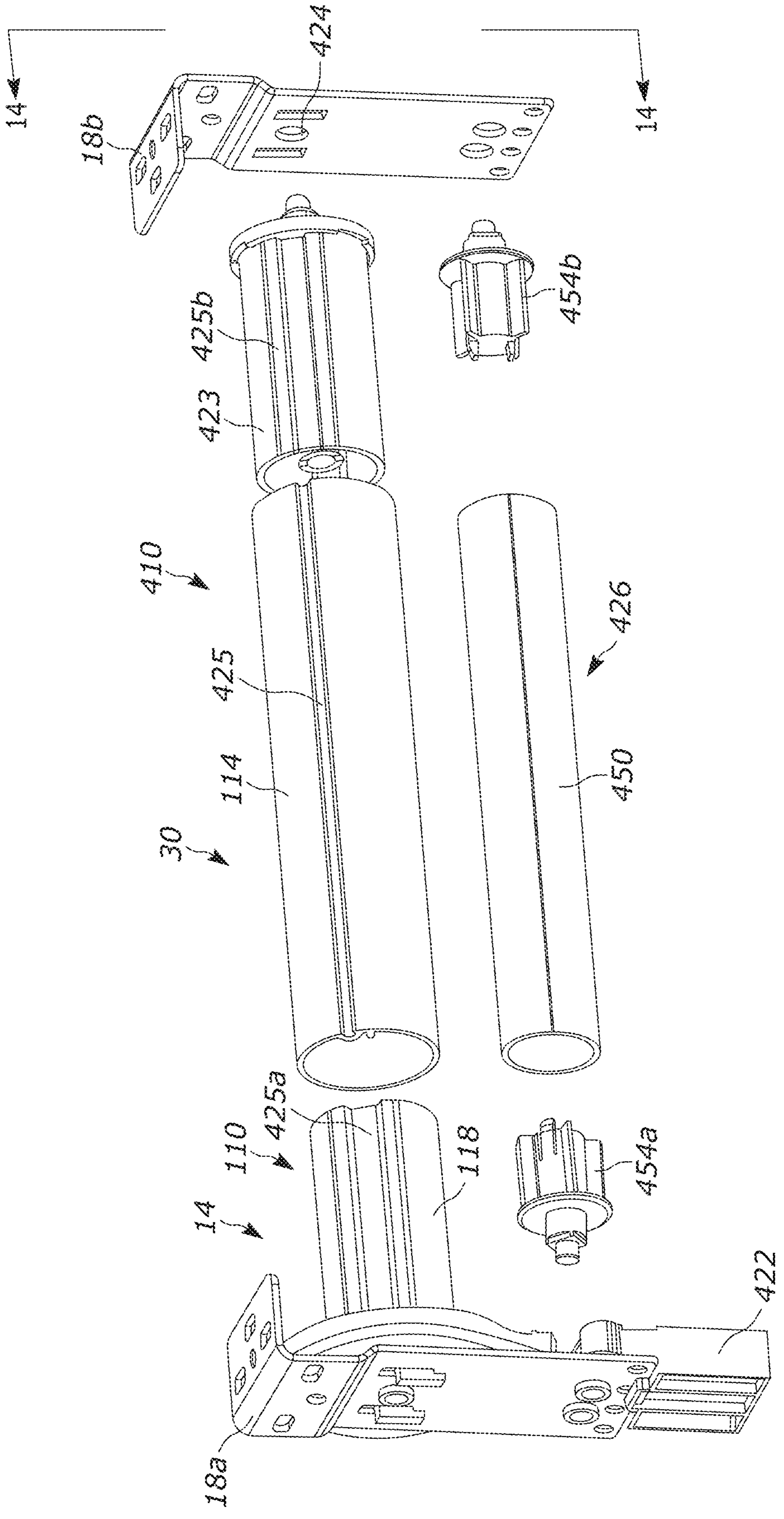
FIG. 13 is a partially exploded perspective view of a covering including another embodiment of the shade mount assembly.
Figure 14:
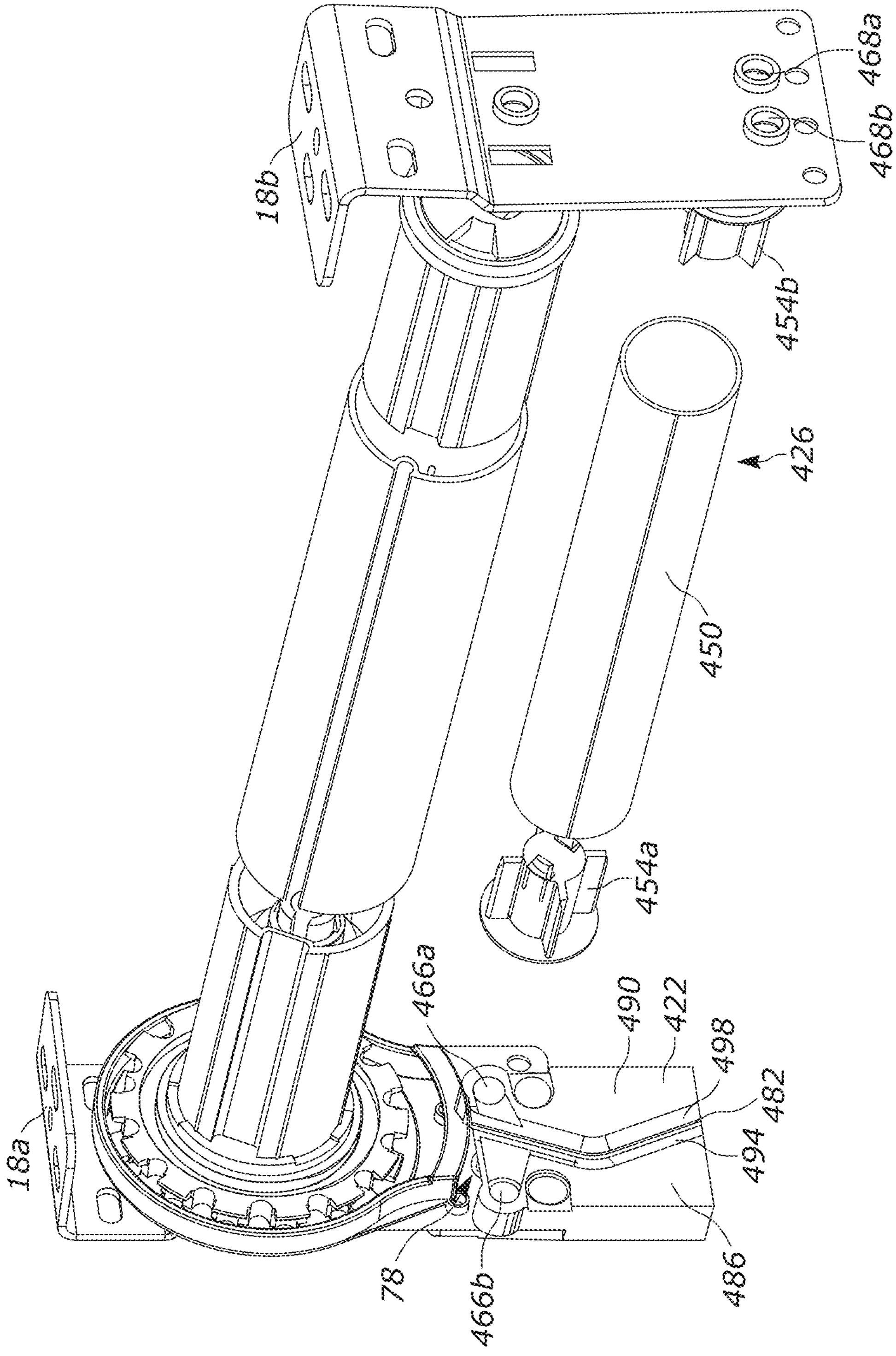
FIG. 14 is a partially exploded perspective view of the shade mount assembly along line 14-14 of FIG. 13.

FIG. 13-14 illustrate another embodiment of a covering 410 (e.g., a window shade) including the mounting assembly 14 for mounting the covering 410 within an architectural opening (e.g., a window, a C-channel, etc.). The covering 410 is substantially similar to covering 10, 310, and only the differences are described herein. Similar structure is referenced with the same reference numerals.

The mounting assembly 14 includes a first bracket 18*a* and a second, opposing bracket 18*b*. The first and second brackets 18*a*, 18*b* are mirror images of the same bracket. A diverter 422 is selectively coupled to the first bracket 18*a*. The brackets 18*a*, 18*b* support the roller assembly 30 and a diverter shaft assembly 426. More specifically, the first bracket 18*a* includes the drive assembly 110 and the associated drive roller 118. The roller assembly 30 includes the material roll 114. The material roll 114 couples to (or receives) the drive roller 118 of the drive assembly 110 at one end, and coupled to (or receives) an idler 423 at the second, opposite end. The idler 423 is received by a mounting aperture 424 defined by the second bracket 18*b*. The material roll 114 can include a depression 425 (or slot) that is keyed to an associated portion 425*a* of the drive roller 118 and associate portion 425*b* of the idler 423 to facilitate a slidable and rotatable connection. The idler 423 can be biased outward (or away from the material roll 114) to facilitate engagement with the bracket 18*b*.

The diverter shaft assembly 426 includes a hollow shaft 450 (or diverter tube or tube) coupled to opposing end caps 454*a, b*. The end caps 454*a*, 454*b* are removably received by the hollow shaft 450. The end caps 454*a*, 454*b* can be biased outward (or away from the hollow shaft 450) to facilitate engagement with the brackets 18*a*, 18*b*. In this embodiment, the diverter hollow shaft 450 is generally larger in diameter than the hollow shaft 150 (shown in FIG. 1) to decrease shaft deflection. However, due to the increase in diameter of the diverter hollow shaft 450, the diverter 422 includes keyholes 466*a*, 466*b* that are configured to couple the diverter shaft assembly 426 to the bracket 18. With reference to FIG. 14, the end cap 454*a* is configured to be received by one of the first keyhole 466*a* or second keyhole 466*b*. The keyholes 466*a*, 466*b* are positioned in the diverter 422 to eliminate interference between the diverter shaft assembly 426 and the continuous loop operator (not shown) received by the diverter 422. The end cap 454*b* is configured to be received by an associated aperture 468*a*, 468*b* in the second bracket 18*b*.

The diverter 422 includes the slot 78 and a non-linear opening 482. The slot 78 is at least partially formed by a first flange 486 and a second flange 490. The first flange 486 includes a first curved edge 494 and the second flange 490 includes a second curved edge 498. The two curved edges 494, 498 are spaced apart to define the non-linear opening 482. The non-linear opening 482 is an angled geometry and is configured to receive the chain 126 (or continuous loop operated 126) as described above in association with the opening 82.

What is claimed is:

1. A covering for an architectural opening comprising:
a bracket;
a shaft coupled to the bracket;
a roller assembly coupled to the bracket, the roller assembly including:
a material roll with a covering material;
a drive roller drivingly coupled to the material roll and operable to rotate with respect to the bracket about a first rotational axis; and
a continuous loop operator operably connected to the drive roller, the continuous loop operator including a first side portion spaced from a second side portion; and
a continuous loop operator diverter including a guide portion defining a slot, the first and second side portions of the continuous loop operator configured to extend through the slot, the continuous loop operator diverter defines an aperture extending through the continuous loop operator diverter, the shaft is at least partially received within the aperture, the continuous loop operator diverter configured to couple to the bracket in one of a first configuration or a second configuration,
wherein in the first configuration the continuous loop operator diverter is coupled to the bracket at a first position on the bracket,
wherein in the second configuration the continuous loop operator diverter is coupled to the bracket at a second position on the bracket, the second position being different than the first position,
wherein the position of the slot is different between the first configuration and the second configuration, and
wherein the covering material includes a first portion that extends between the material roll and the shaft.

2. The covering of claim 1, wherein the covering material includes a second portion that extends from the shaft and extends within a plane.

3. The covering of claim 2, wherein the second portion is configured to adjustably extend between a first length and a second length, the second length being longer than the first length.

4. The covering of claim 3, wherein the continuous loop operator diverter defines a centerline that extends within the plane.

5. The covering of claim 1, wherein the shaft is configured to rotate relative to the continuous loop operator diverter.

6. The covering of claim 1, wherein the continuous loop operator diverter includes a first flange and a second flange, the flanges define the slot.

7. The covering of claim 6, wherein the first flange includes a first non-linear edge and the second flange includes a second non-linear edge, the first and second edges define a non-linear opening, the non-linear opening configured to facilitate insertion of the first side portion and the second side portion of the continuous loop operator into the slot.

8. The covering of claim 1, wherein the shaft is rotatable with respect to the bracket about a second rotational axis.

9. The covering of claim 8, wherein the second rotational axis is offset from the first rotational axis in at least two directions.

10. The covering of claim 1, wherein the covering material includes a second portion that extends from the shaft in a plane, regardless of a length the second portion extends from the shaft.

11. The covering of claim 1, wherein the aperture at least partially receives the shaft with the continuous loop operator diverter coupled to the bracket in either of the first or second configurations.

12. The covering of claim 11, wherein the shaft is rotatable with respect to the bracket about a second rotational axis, and wherein the second rotational axis is offset from the first rotational axis in at least two directions.

13. The covering of claim 1, wherein the first position is horizontally offset from the second position.

14. The covering of claim 1, wherein the first position is vertically offset from the second position.

15. A mounting assembly for a covering of an architectural opening comprising:
a bracket;
a roller assembly coupled to the bracket, the roller assembly including:
a material roll carrying a covering material; and a drive roller drivingly engaging the material roll, the drive roller operable to rotate relative to the bracket around a first rotational axis;

a diverter shaft coupled to the bracket;

a continuous loop operator diverter selectively coupled to the bracket in one of a first position on the bracket or a second position on the bracket, the second position being a different location on the bracket than the first position, the continuous loop operator diverter defines a first aperture and a second aperture, wherein the diverter shaft is configured to engage one of the first aperture or the second aperture; and a continuous loop operator configured to actuate the drive roller, the continuous loop operator received by a slot defined by the continuous loop operator diverter, wherein a position of the slot relative to the bracket changes between the first position and the second position.

16. The mounting assembly of claim 15, wherein the covering material extends from the material roll along a portion of the diverter shaft.

17. The mounting assembly of claim 15, wherein the bracket defines a first aperture and a second aperture, wherein in response to the continuous loop operator diverter being selectively coupled to the bracket in the first position, the diverter shaft engages the first aperture, and wherein in response to the continuous loop operator diverter being selectively coupled to the bracket in the second position, the diverter shaft engages the second aperture.

18. The mounting assembly of claim 17, wherein the continuous loop operator diverter defines a window, wherein in response to the continuous loop operator diverter being selectively coupled to the bracket in the first position, the window is aligned with the first aperture, and wherein in response to the continuous loop operator diverter being selectively coupled to the bracket in the second position, the window is aligned with the second aperture.

* * * * *